US010133972B2

(12) United States Patent
Fujioka et al.

(10) Patent No.: US 10,133,972 B2
(45) Date of Patent: Nov. 20, 2018

(54) INFORMATION PROCESSING APPARATUS, INFORMATION PROCESSING METHOD, AND INFORMATION PROCESSING SYSTEM

(71) Applicants: Kenichi Fujioka, Kanagawa (JP); Yuu Yamashita, Kanagawa (JP)

(72) Inventors: Kenichi Fujioka, Kanagawa (JP); Yuu Yamashita, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 193 days.

(21) Appl. No.: 15/171,113

(22) Filed: Jun. 2, 2016

(65) Prior Publication Data
US 2016/0371573 A1 Dec. 22, 2016

(30) Foreign Application Priority Data

Jun. 18, 2015 (JP) .................................. 2015-123207
Feb. 26, 2016 (JP) .................................. 2016-036081

(51) Int. Cl.
G06F 3/048 (2013.01)
G06K 15/00 (2006.01)
G06K 15/02 (2006.01)
G06F 3/0484 (2013.01)
G06F 3/0482 (2013.01)

(52) U.S. Cl.
CPC ....... G06K 15/4065 (2013.01); G06F 3/0482 (2013.01); G06F 3/04845 (2013.01); G06F 3/04847 (2013.01); G06K 15/02 (2013.01)

(58) Field of Classification Search
CPC ............... G06K 15/02; G06K 15/4065; G06F 3/04845; G06F 3/0482; G06F 3/04847
See application file for complete search history.

(56) References Cited

U.S. PATENT DOCUMENTS

| 9,606,696 | B2* | 3/2017 | Oguma | ................ | G06F 3/0481 |
| 2005/0088681 | A1* | 4/2005 | Hosoda | ................ | G06F 3/1204 358/1.14 |
| 2007/0263242 | A1* | 11/2007 | Takahashi | .......... | G03G 15/6508 358/1.14 |

(Continued)

FOREIGN PATENT DOCUMENTS

| JP | 2006-201712 | 8/2006 |
| JP | 2008-171197 | 7/2008 |

Primary Examiner — William Bashore
Assistant Examiner — Gregory A Distefano
(74) Attorney, Agent, or Firm — Cooper & Dunham LLP

(57) ABSTRACT

An information processing apparatus includes a memory that stores, for each one of a plurality of paper types, paper profile information that includes multiple paper attribute information each defining an attribute of paper and stores preferentially displayed paper attribute information in association with at least one configuration, the preferentially displayed paper attribute information indicating paper attribute information to be displayed preferentially compared to other paper attribute information of the multiple paper attribute information and circuitry that obtains preferentially displayed paper attribute information corresponding to paper to be printed in the at least one configuration, and control a display to display preferentially displayed paper attribute information.

7 Claims, 29 Drawing Sheets

(56) References Cited

U.S. PATENT DOCUMENTS

| | | | |
|---|---|---|---|
| 2008/0003011 A1* | 1/2008 | Unno | G03G 15/6508 399/82 |
| 2009/0147295 A1* | 6/2009 | Pandit | G06Q 10/06 358/1.15 |
| 2012/0036455 A1* | 2/2012 | Holt | G06F 3/0482 715/753 |

* cited by examiner

FIG. 6A

| PAPER NAME | PAPER OUTLINE | SIZE | BASIC WEIGHT | PAPE... |
|---|---|---|---|---|
| 11×17 SEF W2 | 11.0×17.0 in | 11×17 | 80 | PLAIN |
| 13×19.2 inch | 330.2×487.7 mm | 13×19.2 | 80 | PLAIN |
| 2sided Allowed_No | 2sided Allowed_No | A4 (210×297 mm) | 60 | PLAIN |
| 2sided Allowed_Yes | 2sided Allowed_Yes | A4 (210×297 mm) | 60 | PLAIN |
| A3 SEF w5 | 297.0×420.0 mm | A3 (297×420 mm) | 200 | PLAIN |
| A3 engine | 297.0×420.0 mm | A3 (297×420 mm) | 80 | PLAIN |
| A4 | 210.0×297.0 mm | A4 (210×297 mm) | 80 | PLAIN |
| A4 LEF engine | 210.0×297.0 mm | A4 (210×297 mm) | 80 | PLAIN |
| A4 LEF w3 | 210.0×297.0 mm | A4 (210×297 mm) | 100 | PLAIN |

| NO | PAPER ATTRIBUTE INFORMATION | NO | PAPER ATTRIBUTE INFORMATION |
|---|---|---|---|
| 1 | PAPER FEEDING TRAY | 21 | DUPLEX, FRONT, X |
| 2 | PAPER NAME | 22 | DUPLEX, BACK, Y |
| 3 | PAPER OUTLINE | 23 | DUPLEX, BACK, X |
| 4 | SIZE | 24 | MIRROR, FRONT, Y |
| 5 | BASIC WEIGHT | 25 | MIRROR, FRONT, X |
| 6 | PAPER COLOR | 26 | MIRROR, BACK, Y |
| 7 | PAPER TYPE | 27 | MIRROR, BACK, X |
| 8 | CODING (FRONT SURFACE) | 28 | FRONT SURFACE, TEXT |
| 9 | WIDTH/LENGTH | 29 | FRONT SURFACE, IMAGE |
| 10 | NUMBER OF TABS | 30 | FRONT SURFACE, LINE ART |
| 11 | UPPER MARGIN | 31 | FRONT SURFACE, SMOOTH SHADE |
| 12 | TAB WIDTH | 32 | BACK SURFACE, TEXT |
| 13 | TAB HEIGHT | 33 | BACK SURFACE, IMAGE |
| 14 | TAB SHIFT | 34 | BACK SURFACE, LINE ART |
| 15 | NECESSARY TO DISTINGUISH EDGES | 35 | BACK SURFACE, SMOOTH SHADE |
| 16 | NECESSARY TO DISTINGUISH SURFACES | 36 | SURFACE TEXTURE |
| 17 | ALLOW DUPLEX PRINTING | 37 | PUNCHED |
| 18 | SIMPLEX, Y | | |
| 19 | SIMPLEX, X | | |
| 20 | DUPLEX, FRONT, Y | | |

| PAPER FEEDING TRAY | PAPER NAME | PAPER OUTLINE | SIZE | BASIC WEIGHT |
|---|---|---|---|---|
| | 11 × 17 SEF W2 | 11.0 × 17.0 in | 11 × 17 | 80 |
| | 13 × 19.2 inch | 330.2 × 487.7 mm | 13 × 19.2 | 60 |
| | 2sided Allowed_No | 2sided Allowed_No | A4 (210 × 297 mm) | 60 |
| | 2sided Allowed_Yes | 2sided Allowed_Yes | A4 (210 × 297 mm) | 200 |
| | A3 SEF w5 | 297.0 × 420.0 mm | A3 (297 × 420 mm) | 80 |
| | A3 engine | 297.0 × 420.0 mm | A3 (297 × 420 mm) | 80 |
| | A4 | 210.0 × 297.0 mm | A4 (210 × 297 mm) | 80 |
| | A4 LEF engine | 210.0 × 297.0 mm | A4 (210 × 297 mm) | 80 |
| | A4 LEF w3 | 210.0 × 297.0 mm | A4 (210 × 297 mm) | 100 |
| | A6 | 105.0 × 148.0 mm | A6 (105 × 148 mm) | 80 |
| | B6 | 128.0 × 182.0 mm | B6 (128 × 182 mm) | 80 |
| | Color_Custom | Color_Custom | A4 (210 × 297 mm) | 80 |
| | Custom 330.2 × 487.7 | 330.2 × 487.7 mm | 13 × 19.2 | 80 |
| | Custom 330.2 × 487 | 330.2 × 487.0 mm | INDEFINITE SIZE | 80 |
| | Custom 330.2 × 487.1 | 330.2 × 487.1 mm | INDEFINITE SIZE | 80 |
| | Custom 330.2 × 487.2 | 330.2 × 487.2 mm | 13 × 19.2 | 80 |
| | Custom 330.2 × 487.3 | 330.2 × 487.3 mm | 13 × 19.2 | 80 |
| | Custom 330.2 × 487.4 | 330.2 × 487.4 mm | 13 × 19.2 | 80 |

| TARGET FUNCTION INDEX | PAPER ATTRIBUTE SORTING TARGET FUNCTION | | PAPER ATTRIBUTE INFORMATION DISPLAYED PREFERENTIALLY * |
|---|---|---|---|
| 1 | FACING | DUPLEX | ALLOW DUPLEX PRINTING |
| | | | DUPLEX, FRONT, Y |
| | | | DUPLEX, FRONT, X |
| | | | DUPLEX, BACK, Y |
| | | | DUPLEX, BACK, X |
| 2 | EXCEPTION PAGE | INDEX PAPER | NUMBER OF TABS |
| | | | UPPER MARGIN |
| | | | TAB WIDTH |
| | | | TAB HEIGHT |
| | | | TAB SHIFT |
| 3 | FINISH | PUNCH | PUNCHIED |
| 4 | COLOR EXPERT SETTINGS | OUTPUT PROFILE | FRONT SURFACE, TEXT |
| | | | FRONT SURFACE, IMAGE |
| | | | FRONT SURFACE, LINE ART |
| | | | FRONT SURFACE, SMOOTH SHADE |
| | | | BACK SURFACE, TEXT |
| | | | BACK SURFACE, IMAGE |
| | | | BACK SURFACE, LINE ART |
| | | | BACK SURFACE, SMOOTH SHADE |
| 5 | FACING | SIMPLEX | SIMPLEX, Y |
| | | | SIMPLEX, X |

* PRIORITY: UPPER TO LOWER

| NO | PAPER SELECTABLE FUNCTIONS | | PAPER SELECTION MODE |
|---|---|---|---|
| 1 | FACING: BINDING | COVER PAGE (MAGAZINE) | USER CONFIGURATION / PAPER PROFILE |
| 2 | PAPER | | SAME AS ABOVE |
| 3 | EXCEPTION PAGE | COVER PAGE | SAME AS ABOVE |
| 4 | | INSERT PAPER | SAME AS ABOVE |
| 5 | | INDEX PAPER | – (PAPER PROFILE ONLY) |
| 6 | | EXCEPT PAPER | USER CONFIGURATION / PAPER PROFILE |

FIG. 14A

| ALLOW DUPLEX PRINTING | SIMPLEX, Y | SIMPLEX, X | DUPLEX, FRONT, Y | DUPLEX, FRONT, X | DUPLEX, BACK, Y | DUPL |
|---|---|---|---|---|---|---|
| YES | 0.00 inch | 0.00 inch | 0.00 inch | 0.00 inch | 0.00 inch | 0.00 i |
| YES | 0.00 inch | 0.00 inch | 0.00 inch | 0.00 inch | 0.00 inch | 0.00 i |
| YES | 0.00 inch | 0.00 inch | 0.00 inch | 0.00 inch | 0.00 inch | 0.00 i |
| YES | 0.00 inch | 0.00 inch | 0.00 inch | 0.00 inch | 0.00 inch | 0.00 i |
| NO | 0.0 mm | 0.0 mm | 0.0 mm | 0.0 mm | 0.0 mm | 0.0 m |
| YES | 0.0 mm | 0.0 mm | 0.0 mm | 0.0 mm | 0.0 mm | 0.0 m |
| YES | 0.0 mm | 0.0 mm | 0.0 mm | 0.0 mm | 0.0 mm | 0.0 m |
| YES | 0.0 mm | 0.0 mm | 0.0 mm | 0.0 mm | 0.0 mm | 0.0 m |
| NO | 0.0 mm | 0.0 mm | 0.0 mm | 0.0 mm | 0.0 mm | 0.0 m |
| NO | 0.0 mm | 0.0 mm | 0.0 mm | 0.0 mm | 0.0 mm | 0.0 m |
| NO | 0.0 mm | 0.0 mm | 0.0 mm | 0.0 mm | 0.0 mm | 0.0 m |
| YES | 0.0 mm | 0.0 mm | 0.0 mm | 0.0 mm | 0.0 mm | 0.0 m |
| YES | 0.0 mm | 0.0 mm | 0.0 mm | 0.0 mm | 0.0 mm | 0.0 m |
| YES | 0.0 mm | 0.0 mm | 0.0 mm | 0.0 mm | 0.0 mm | 0.0 m |
| NO | 0.0 mm | 0.0 mm | 0.0 mm | 0.0 mm | 0.0 mm | 0.0 m |
| NO | 0.0 mm | 0.0 mm | 0.0 mm | 0.0 mm | 0.0 mm | 0.0 m |

1110

SCROLL HORIZONTALLY

FIG. 14B

| PAPER FEEDING TRAY | PAPER NAME | SIZE | ALLOW DUPLEX PRINTING | DUPLEX, FRONT, Y | DUPLEX, FRONT, X | DUPL |
|---|---|---|---|---|---|---|
| | Front Coating_Matco... | A4 (210 × 297 mm) | NO | 0.00 mm | 0.00 mm | 0.00 m |
| | Front Coating_None | A4 (210 × 297 mm) | YES | 0.00 mm | 0.00 mm | 0.00 m |
| | Ledger engine | 11 × 17 | YES | 0.00 inch | 0.00 inch | 0.00 i |
| | Legal engine | Legal (8.5 × 14) | YES | 0.00 inch | 0.00 inch | 0.00 i |
| | Letter LEF engine | Letter (8.5 × 11) | YES | 0.00 inch | 0.00 inch | 0.00 i |
| | Letter W2 | Letter (8.5 × 11) | NO | 0.0 mm | 0.0 mm | 0.0 m |
| 3 | Magnetic | A4 (210 × 297 mm) | YES | 0.0 mm | 0.0 mm | 0.0 m |
| 4 | Metallic | A4 (210 × 297 mm) | YES | 0.0 mm | 0.0 mm | 0.0 m |
| | Orientation_Long edg... | A4 (210 × 297 mm) | NO | 0.0 mm | 0.0 mm | 0.0 m |
| | Orientation_Short ed... | A4 (210 × 297 mm) | NO | 0.0 mm | 0.0 mm | 0.0 m |
| | Outputprofile_Diferen... | A4 (210 × 297 mm) | NO | 0.0 mm | 0.0 mm | 0.0 m |
| | PrePunched_No | A4 (210 × 297 mm) | YES | 0.0 mm | 0.0 mm | 0.0 m |
| | PrePunched_Yes | A4 (210 × 297 mm) | YES | 0.0 mm | 0.0 mm | 0.0 m |
| | Shift_NumberOfTabs... | A4 (210 × 297 mm) | YES | 0.0 mm | 0.0 mm | 0.0 m |
| | Side Sensitive_No | A4 (210 × 297 mm) | NO | 0.0 mm | 0.0 mm | 0.0 m |
| | Side Sensitive_Yes | A4 (210 × 297 mm) | | 0.0 mm | 0.0 mm | 0.0 m |
| | TEST | A4 (210 × 297 mm) | | 0.0 mm | 0.0 mm | 0.0 m |
| | TEST2 | A4 (210 × 297 mm) | | 0.0 mm | 0.0 mm | 0.0 m |

| NUMBER OF TABS | UPPER MARGIN | TAB WIDTH | TAB HEIGHT | TAB SHIFT | NECESSARY TO DISTINGUISH EDGES | NECESSARY TO DISTINGUISH SURFACES | SIMPLEX, Y | SIMP |
|---|---|---|---|---|---|---|---|---|
| 1 | 0.0 mm | 12.7 mm | 14.0 mm | 0.0 mm | NO | NO | 0.0 mm | 0.0 m |
| 1 | 0.0 mm | 12.7 mm | 14.0 mm | 0.0 mm | NO | NO | 0.0 mm | 0.0 m |
| 1 | 0.0 mm | 2.5 mm | 12.7 mm | 0.0 mm | NO | NO | 0.0 mm | 0.0 m |
| 5 | 0.0 mm | 12.7 mm | 15.0 mm | 0.0 mm | | | | 0.0 m |

→ SCROLL HORIZONTALLY

| PAPER FEEDING TRAY | PAPER NAME | SIZE | NUMBER OF TABS | UPPER MARGIN | TAB WIDTH | TAB HEIGHT |
|---|---|---|---|---|---|---|
| | Tab_H14mm | A4 (210 × 297mm) | 1 | 0.0 mm | 12.7 mm | 14.0 mm |
| | Tabstock_TextOnTab | A4 (210 × 297mm) | 1 | 0.0 mm | 12.7 mm | 14.0 mm |
| | Tabstock_TextOnTab_Min | A4 (210 × 297mm) | 1 | 0.0 mm | 2.5 mm | 12.7 mm |
| | TextOnTab_Num5_Offset... | A4 (210 × 297mm) | 5 | 0.0 mm | 12.7 mm | 15.0 mm |

FIG. 17

| PAPER NAME | PAPER OUTLINE | SIZE | BASIC WEIGHT | PAPE... |
|---|---|---|---|---|
| 11 × 17 SEF W2 | 11.0 × 17.0 in | 11 × 17 | 80 | PLAIN |
| 13 × 19.2 inch | 330.2 × 487.7 mm | 13 × 19.2 | 80 | PLAIN |
| 2sided Allowed_No | 2sided Allowed_No | A4 (210 × 297 mm) | 60 | PLAIN |
| 2sided Allowed_Yes | 2sided Allowed_Yes | A4 (210 × 297 mm) | 60 | PLAIN |
| A3 SEF w5 | 297.0 × 420.0 mm | A3 (297 × 420 mm) | 200 | PLAIN |
| A3 engine | 297.0 × 420.0 mm | A3 (297 × 420 mm) | 80 | PLAIN |
| A4 | 210.0 × 297.0 mm | A4 (210 × 297 mm) | 80 | PLAIN |
| A4 LEF engine | 210.0 × 297.0 mm | A4 (210 × 297 mm) | 80 | PLAIN |
| A4 LEF w3 | 210.0 × 297.0 mm | A4 (210 × 297 mm) | 100 | PLAIN |

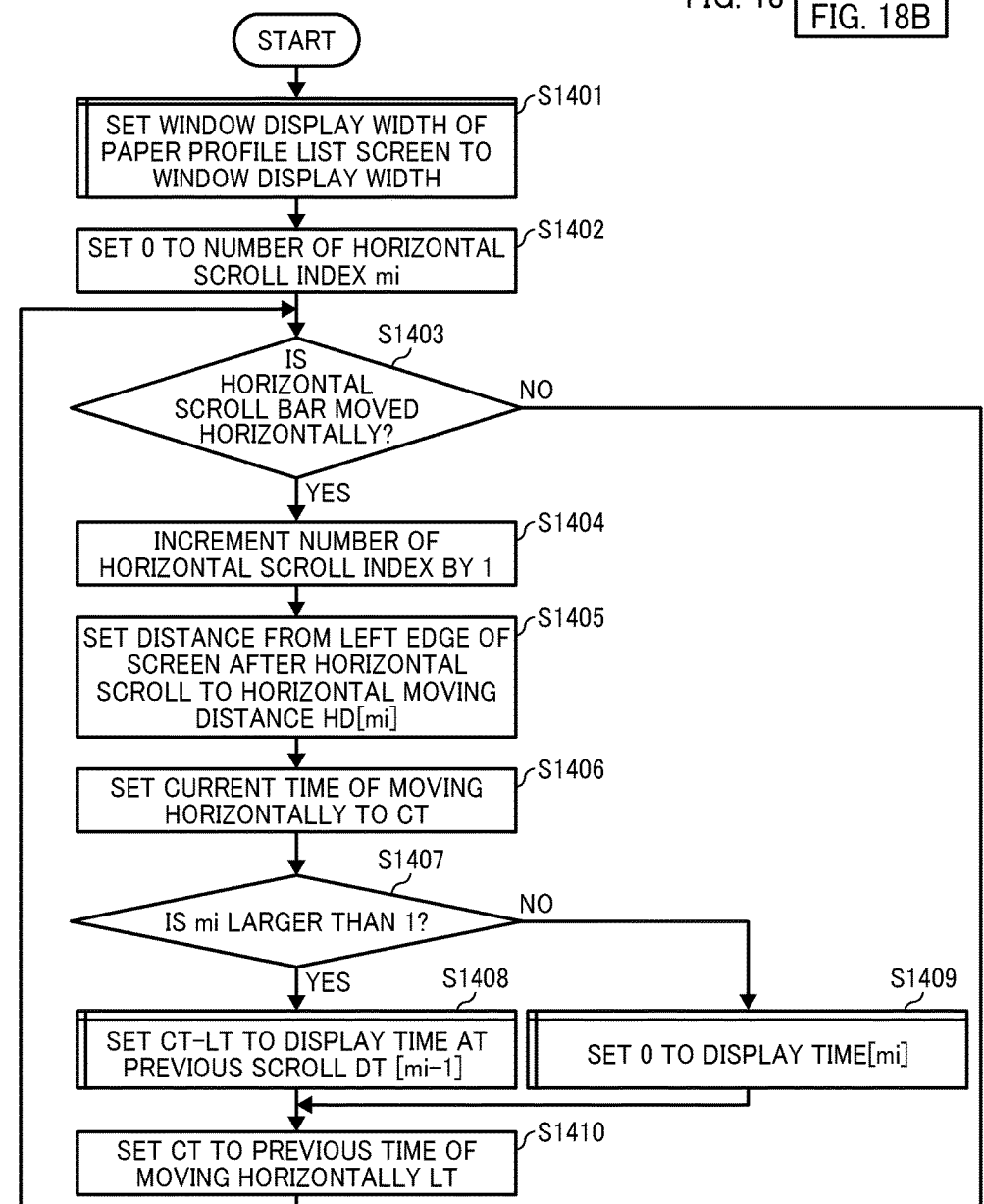

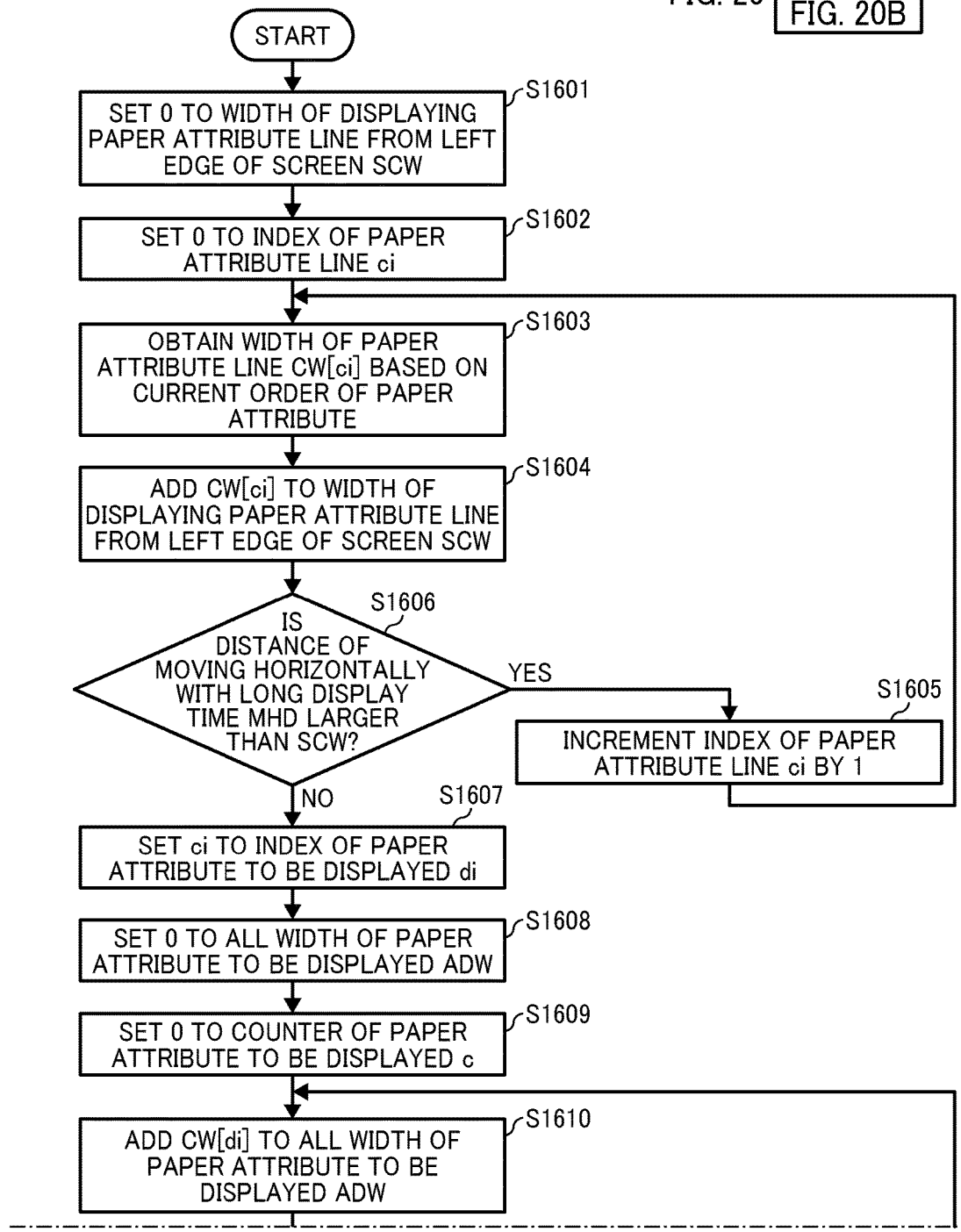

FIG. 21

| ORDER OF PAPER ATTRIBUTE | PAPER ATTRIBUTE INFORMATION | WIDTH OF PAPER ATTRIBUTE LINE |
|---|---|---|
| 1 | PAPER FEEDING TRAY | 80 |
| 2 | PAPER NAME | 80 |
| 3 | PAPER OUTLINE | 80 |
| 4 | SIZE | 80 |
| 5 | BASIC WEIGHT | 60 |
| 6 | PAPER COLOR | 60 |
| 7 | PAPER TYPE | 60 |
| 8 | CODING (FRONT SURFACE) | 60 |
| 9 | WIDTH/LENGTH | 80 |
| 10 | NUMBER OF TABS | 60 |
| 11 | UPPER MARGIN | 60 |
| 12 | TAB WIDTH | 60 |
| 13 | TAB HEIGHT | 60 |
| 14 | TAB SHIFT | 60 |
| 15 | NECESSARY TO DISTINGUISH EDGES | 60 |
| 16 | NECESSARY TO DISTINGUISH SURFACES | 60 |
| 17 | ALLOW DUPLEX PRINTING | 60 |
| 18 | SIMPLEX, Y | 60 |
| 19 | SIMPLEX, X | 60 |
| 20 | DUPLEX, FRONT, Y | 60 |
| 21 | DUPLEX, FRONT, X | 60 |
| 22 | DUPLEX, BACK, Y | 60 |
| 23 | DUPLEX, BACK, X | 60 |
| 24 | MIRROR, FRONT, Y | 60 |
| 25 | MIRROR, FRONT, X | 60 |
| 26 | MIRROR, BACK, Y | 60 |
| 27 | MIRROR, BACK, X | 60 |
| 28 | FRONT SURFACE, TEXT | 60 |
| 29 | FRONT SURFACE, IMAGE | 60 |
| 30 | FRONT SURFACE, LINE ART | 80 |
| 31 | FRONT SURFACE, SMOOTH SHADE | 80 |
| 32 | BACK SURFACE, TEXT | 80 |
| 33 | BACK SURFACE, IMAGE | 80 |
| 34 | BACK SURFACE, LINE ART | 80 |
| 35 | BACK SURFACE, SMOOTH SHADE | 80 |
| 36 | SURFACE TEXTURE | 80 |
| 37 | PUNCHED | 80 |

FIG. 22

| TARGET FUNCTION INDEX | PAPER ATTRIBUTE SORTING TARGET FUNCTION | | PAPER ATTRIBUTE INFORMATION DISPLAYED PREFERENTIALLY *1 |
|---|---|---|---|
| 1 | FACING | DUPLEX | – (*2) |
| 2 | EXCEPTION PAGE | INDEX PAPER | NUMBER OF TABS |
| | | | UPPER MARGIN |
| | | | TAB WIDTH |
| | | | TAB HEIGHT |
| | | | TAB SHIFT |
| 3 | FINISH | PUNCH | – |
| 4 | COLOR EXPERT SETTINGS | OUTPUT PROFILE | – |
| 5 | FACING | SIMPLEX | – |

*1 PRIORITY: UPPER TO LOWER
*2 TO BE DETERMINED

FIG. 23

| TARGET FUNCTION INDEX | PAPER ATTRIBUTE SORTING TARGET FUNCTION | | PAPER ATTRIBUTE INFORMATION DISPLAYED PREFERENTIALLY *1 |
|---|---|---|---|
| 1 | FACING | DUPLEX | MIRROR, FRONT, Y |
| | | | MIRROR, FRONT, X |
| | | | MIRROR, BACK, Y |
| | | | MIRROR, BACK, X |
| 2 | EXCEPTION PAGE | INDEX PAPER | – (2*) |
| 3 | FINISH | PUNCH | – |
| 4 | COLOR EXPERT SETTINGS | OUTPUT PROFILE | – |
| 5 | FACING | SIMPLEX | – |

*1 PRIORITY: UPPER TO LOWER
*2 TO BE DETERMINED

INFORMATION PROCESSING APPARATUS, INFORMATION PROCESSING METHOD, AND INFORMATION PROCESSING SYSTEM

CROSS-REFERENCE TO RELATED APPLICATIONS

This patent application is based on and claims priority pursuant to 35 U.S.C. § 119(a) to Japanese Patent Applications No. 2015-123207, filed on Jun. 18, 2015 and No. 2016-036081, filed on Feb. 26, 2016 in the Japan Patent Office, the entire disclosures of which are hereby incorporated by reference herein.

BACKGROUND

Technical Field

The present invention relates to an information processing apparatus, an information processing method, and an information processing system.

Background Art

In commercial printing, printing apparatuses that can register multiple paper profiles including various paper attribute information that indicates paper attributes defined for each paper and use various printing papers are demanded. In the printing apparatuses, it is possible to register various paper profiles, and host computers that control the printing apparatuses obtain the paper profile information to display the paper profile information.

However, since not only there are many paper profiles to be registered but also one paper profile includes various paper attributes, it is preferred to display the paper profiles in an easily understood manner, to make easy for a user to select a desired paper profile. To cope with this issue, technologies that easily select the paper attribute in the paper profile have been proposed.

One of such technologies selects a paper type that fits in specific attributes such as basic weight, paper thickness, and surface characteristic etc. as a paper type to be used for printing among multiple paper types.

SUMMARY

Example embodiments of the present invention provide a novel information processing apparatus includes a memory that stores, for each one of a plurality of paper types, paper profile information that includes multiple paper attribute information each defining an attribute of paper and stores preferentially displayed paper attribute information in association with at least one configuration, the preferentially displayed paper attribute information indicating paper attribute information to be displayed preferentially compared to other paper attribute information of the multiple paper attribute information and circuitry that obtains preferentially displayed paper attribute information corresponding to paper to be printed in the at least one configuration, and control a display to display preferentially displayed paper attribute information.

Further embodiments of the present invention provide an information processing method, and an information processing system.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a diagram illustrating a list of paper profiles used in the information processing system, and FIG. 6B is a diagram illustrating types of paper attribute information used in the information processing system.

FIG. 7B is a diagram illustrating a paper configuration screen of the paper profile list in duplex printing in the information processing system.

FIG. 8B is a diagram illustrating a selection method configuration screen of the paper profile list in index paper printing in the information processing system.

FIG. 9A is a diagram illustrating a function/paper attribute association table managed by the information processing system.

FIG. 14A is a diagram illustrating a conventional screen for selecting duplex printing in the information processing system, and FIG. 14B is a diagram illustrating a screen for selecting duplex printing in the information processing system as an embodiment of the present invention.

FIG. 15A is a diagram illustrating a conventional screen for specifying index paper printing in the information processing system, and FIG. 15B is a diagram illustrating a screen for specifying index paper printing in the information processing system as an embodiment of the present invention.

FIG. 17 is a diagram illustrating a window display width and paper attribute line width in the paper profile list screen used in the information processing system as an embodiment of the present invention.

FIGS. 18A and 18B are diagrams illustrating an operation of storing paper attribute information and a function displayed at a position corresponding to as moving distance after calculating the moving distance from the left edge of the screen in case of moving horizontally longer than a predetermined distance in the paper profile list screen in the information processing system as an embodiment of the present invention.

FIGS. 20A and 20B are diagrams illustrating an operation of obtaining paper attribute information in a displayed window after moving horizontal moving distance from the left edge of the screen based on the horizontal moving distance information whose display time is the longest stored in FIG. 19 as an embodiment of the present invention.

FIG. 21 is a diagram illustrating a width of a paper attribute line from the left edge of the screen for each paper attribute information in the order of paper attributes in the paper profile list screen in the information processing system as an embodiment of the present invention.

FIG. 22 is a diagram illustrating a function/paper attribute association table in the information processing system as an embodiment of the present invention.

FIG. 23 is a diagram illustrating another function/paper attribute association table in the information processing system as an embodiment of the present invention.

Figure 1:
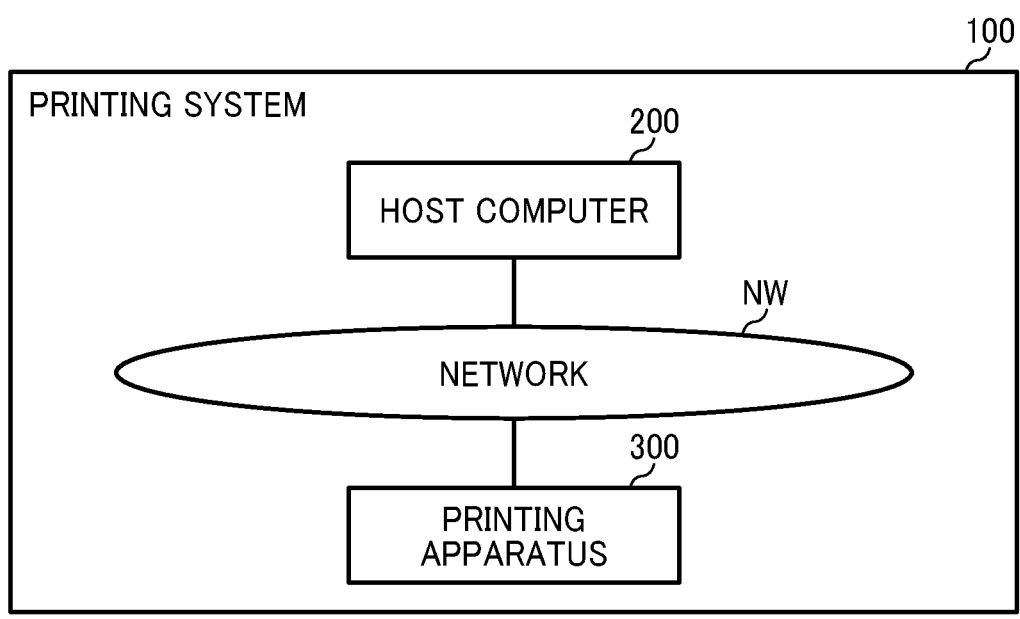
FIG. 1 is a diagram illustrating a schematic configuration of an information processing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In the embodiments described below, in selecting a paper profile via a print configuration screen, a novel information processing apparatus that can check the target paper attribute information among paper profile information that includes multiple paper attribute information as paper attribute defined for each paper easily is provided.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In the embodiments described below, cases of specifying duplex printing and index paper printing are described below as examples. However, in case of specifying printing using other paper included in the paper profile list, it is possible to apply the embodiments too.

The embodiments described below are related to an operation of displaying paper profile information on the print setting screen. More specifically, multiple paper attribute information each defining a paper attribute of one-type paper is stored by paper, as paper profile information. Based on the user selection of paper for printing, paper profile information corresponding to that selected paper is selected, and among the selected paper profile information, paper attribute information to be displayed preferentially compared to other paper attribute information is displayed.

First, a schematic configuration of an information processing system in this embodiment is described below. FIG. 1 is a diagram illustrating a schematic configuration of an information processing system in this embodiment.

A printing system 100 as an example of the information processing system in this embodiment includes a host computer 200 and a printing apparatus 300 as an example of the image processing apparatus connected to a network NW. The printing apparatus 300 includes a paper profile printing function that can register multiple paper profiles and use a selected paper profile. The host computer 200 and the printing apparatus 300 including the paper profile printing function are described in detail later with reference to FIGS. 2 to 5.

In FIG. 1, in the printing system 100, the host computer 200 is connected to the printing apparatus 300 via the network NW. However, it is possible that the host computer 200 is connected to the printing apparatus 300 directly without using the network NW.

Figure 2:
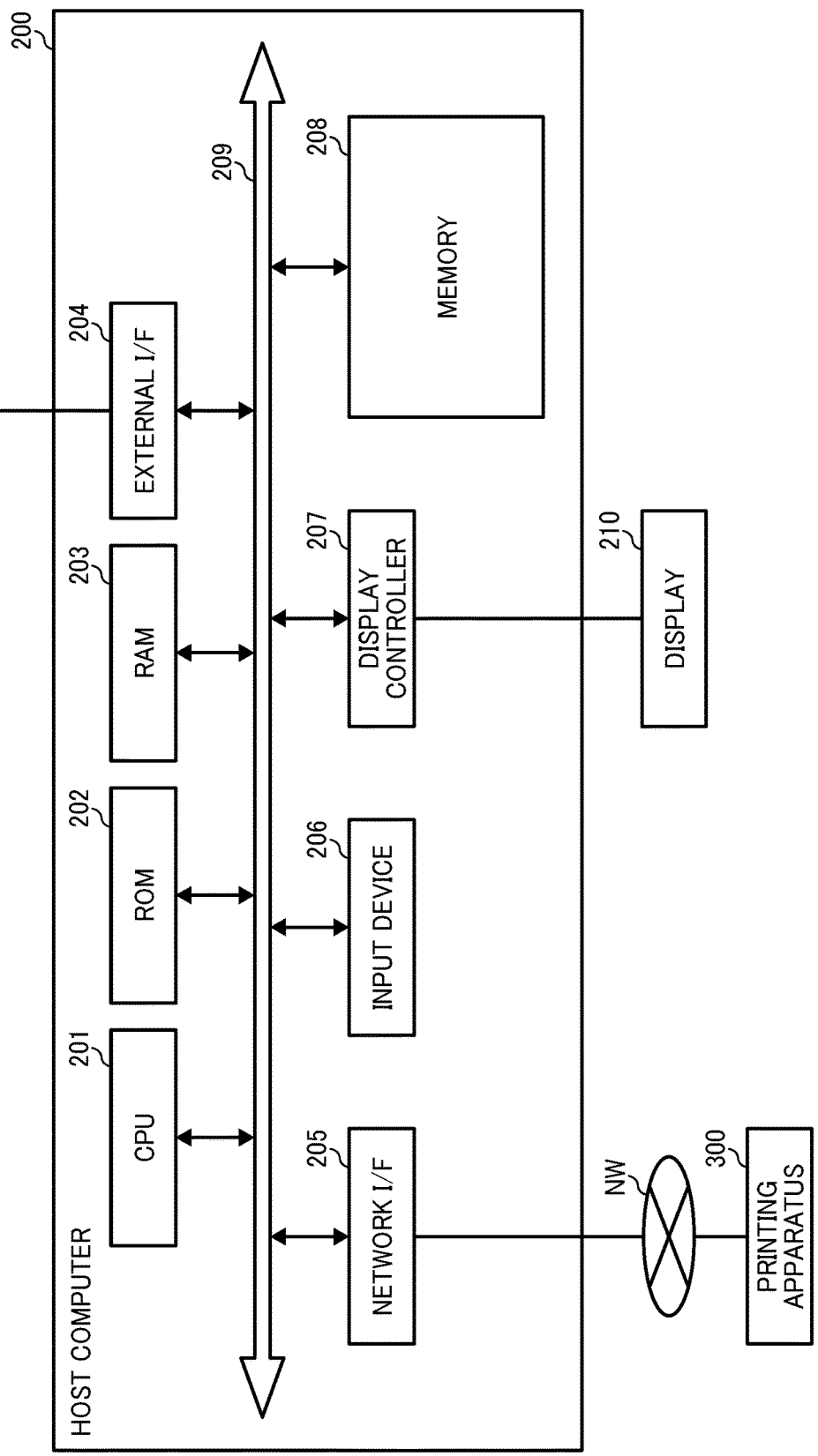
FIG. 2 is a block diagram illustrating a hardware configuration of a host computer of the information processing system as an embodiment of the present invention.

Next, a hardware configuration of the host computer of the information processing system in this embodiment is described below. FIG. 2 is a block diagram illustrating a hardware configuration of a host computer of the information processing system in this embodiment.

As illustrated in FIG. 2, the host computer 200 includes a central processing unit (CPU) 201, a Read Only Memory (ROM) 202, and a Random Access Memory (RAM) 203. In addition, the host computer 200 includes an external interface (I/F) 204, a network I/F 205, an input device 206, a display controller 207, a memory 208, and a bus line 209.

The CPU 201 controls the entire host computer 200. For example, the CPU 201 reads application software 220 and print job generating software 240 from the memory 208 and executes the software using the RAM 203 as a work memory. The ROM 202 stores programs for the host computer 200. The RAM 203 is used as a work area for the CPU 201.

For example, a cable such as Universal Serial Bus (USB) etc. and a removable recording medium 211 are attached to the external I/F 204. The network I/F 205 allows those devices to exchange data with the external printing apparatus 300 via the network NW. For example, the network I/F 205 transfers packet data such as print data etc. to the printing apparatus 300 under control of the CPU 201.

For example, the input device 206 is a user interface (UI) such as a keyboard and a mouse that accept various instructions by user operation. In other cases, the input device 206 may be a touch panel or a voice input device.

For example, the display controller 207 controls an external display 210 at a predetermined resolution and the number of colors etc. based on screen information instructed by the application software 220. For example, the display 210 is a flat panel display (FPD) such as a liquid crystal display or an organic electro luminescence (EL) display etc.

For example, the memory 208 is a nonvolatile memory such as a hard disk drive (HDD) and a flash memory etc.

The bus line 209 electrically connects the components described above with each other as shown in FIG. 2. For example, the bus line 209 is an address bus and a data bus etc. It should be noted that the recording medium 211 is connected to the host computer 200 detachably.

Any nonvolatile memory that can read and write data under control of the CPU 201 may be used as the recording medium 211. For example, a USB memory, a flash memory and an Electrically Erasable, Programmable ROM (EEPROM) etc. may be used as the recording medium 211. In addition, the application software 220 and the print job generating software 240 can be distributed by being recorded in the recording medium 211 or being downloaded from an external server.

In addition, the programs described above may be stored as installable or executable files in a computer-readable recording medium such as the recording medium 211 etc. described above for distribution.

Figure 3:
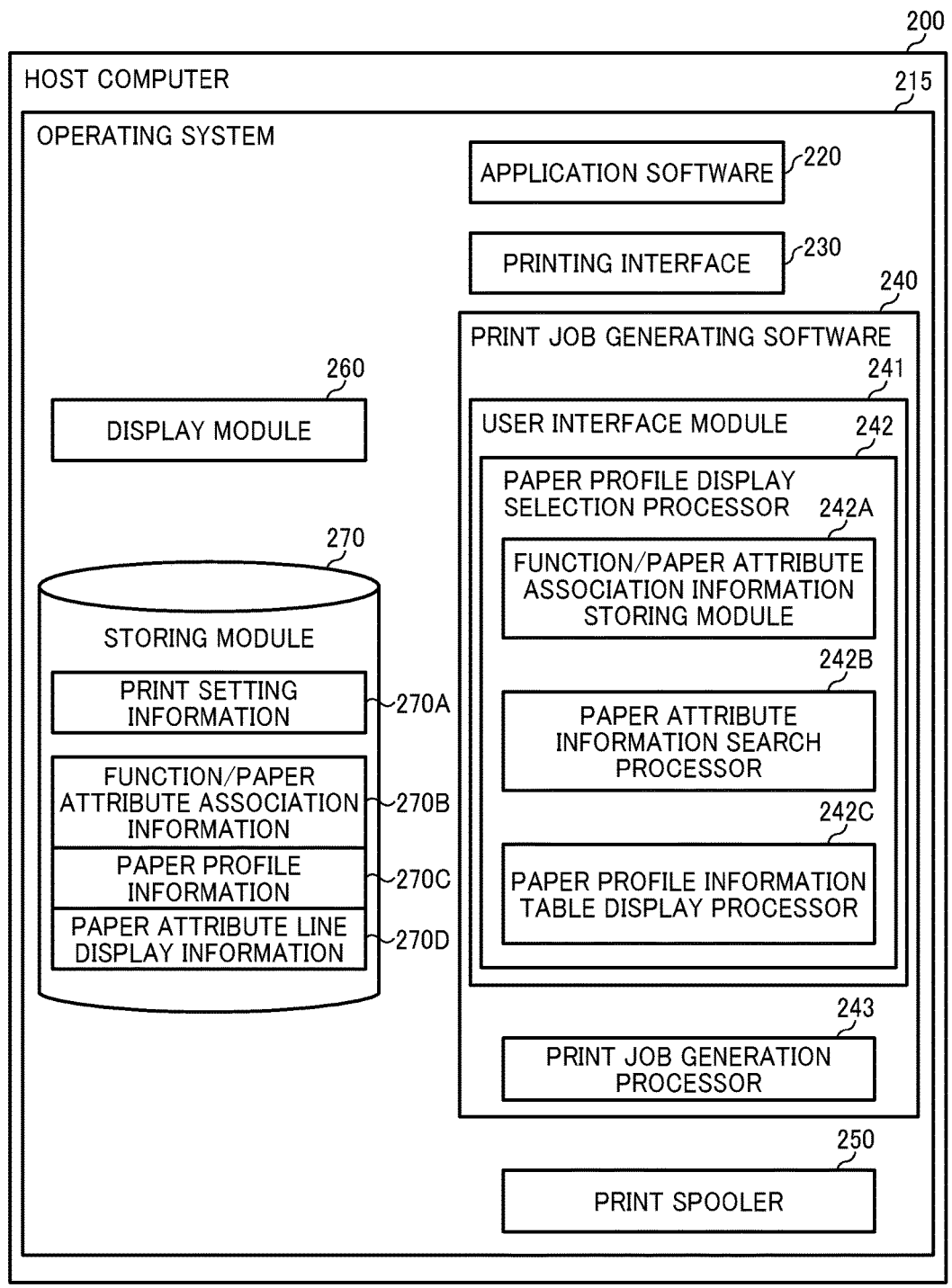
FIG. 3 is a block diagram illustrating a functional configuration of the host computer of the information processing system as an embodiment of the present invention.

Next, a functional configuration of the host computer that constructs the information processing system in this embodiment is described below. FIG. 3 is a block diagram illustrating a functional configuration of the host computer that constructs the information processing system as an embodiment of the present invention.

The host computer 200 includes an operating system 215 that operates the host computer 200, and the application software 220 that operates on the operating system 215 to create and print a document. In addition, the host computer 200 includes a printing interface 230 that commands a print job generating software 240 under instruction of the application software 220.

Furthermore, the host computer 200 includes the print job generating software 240 that generates a print job, and a print spooler 250 that receives the print job transferred by the print job generating software 240 and transfers the print job to the printing apparatus 300. An example of the print job generating software 240 is a printer driver. In addition, the host computer 200 includes a display module that displays a printing configuration and a storing module 270 that stores setting values such as print settings etc.

It should be noted that the print job generating software 240 includes a user interface (UI) module 241 for user interface to configure a printing format on the application software 220. In addition, the print job generating software 240 includes a paper profile display selection processor 242 that obtains paper profile information from the printing apparatus 300 and displays the paper profile information on a print configuration screen (by the display module 260). Furthermore, the print job generating software 240 includes a print job generation processor 243 that generates a print job based on the print configuration.

In addition, the paper profile display selection processor 242 includes a function/paper attribute association information storing module 242A that stores a function/paper attribute association table associating the printing function with the paper attribute information. Furthermore, the paper profile display selection processor 242 includes a paper attribute information search processor 242B that searches for paper attribute information corresponding to a specified printing function. In addition, the paper profile display selection processor 242 includes a paper profile information table display processor 242C that displays the searched paper attribute information preferentially.

The storing module 270 stores values configured on the UI module 241 of the print job generating software 240 in each of print setting information 270A and a function/paper attribute association information 270B. In addition, the storing module 270 stores the paper profile information obtained from the printing apparatus 300 in paper profile information 270C. Furthermore, the storing module 270 stores a fixed width of each paper attribute line for each paper profile in a paper attribute line display information 270D. Since fixed widths of each paper attribute line for each paper profile stored in the paper attribute line display information 270D are different depending on displayed screens as shown in FIGS. 7B and 8B (described later), the paper attribute line display information 270D stores widths of each line.

Figure 4:
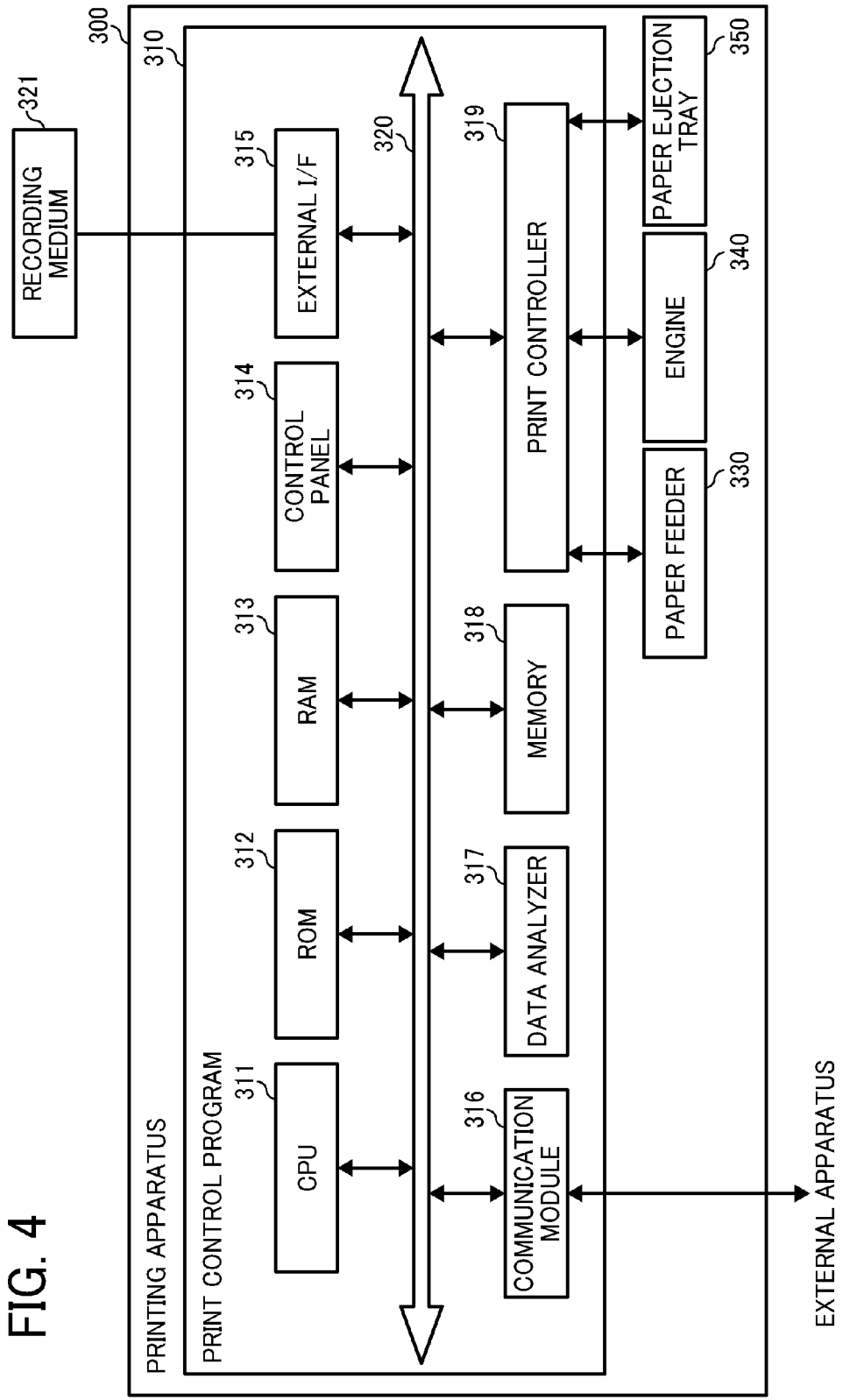
FIG. 4 is a block diagram illustrating a hardware configuration of a printing apparatus of the information processing system as an embodiment of the present invention.

Next, a hardware configuration of the printing apparatus that constructs the information processing system in this embodiment is described below. FIG. 4 is a block diagram illustrating a hardware configuration of a printing apparatus that constructs the information processing system in this embodiment.

In FIG. 4, the printing apparatus 300 includes a print control program 310 that analyzes the received print job and expands the print job into image data to generate video data and an engine 340 that prints the video data on paper. In addition, the printing apparatus 300 includes a paper feeder 330 that feeds paper used for printing and a paper ejection tray 350 on which the printed paper is ejected.

In FIG. 4, in the print control program 310, a CPU 311, a ROM 312, a RAM 313, a control panel 314, an external I/F 315, a communication module 316, a data analyzer 317, a memory 318, and a print controller 319 are connected with each other via a system bus 320.

The CPU 311 controls the control panel 314, the external I/F 315, the communication module 316, the data analyzer 317, the memory 318, and the print controller 319 in accordance with a control program stored in the ROM 312. It should be noted that the ROM 312 includes a data ROM, a font ROM, and a program ROM and stores data, programs, and fonts etc. read by the CPU 311. In addition, the RAM 313 functions as a work area of the CPU 311.

The control panel 314 includes a display unit, and an operation screen is displayed on the display unit to accept user instruction. The paper profile is registered by using the control panel and stored in the memory 318 as the paper profile information.

For example, a cable such as a USB cable etc. and a removable recording medium 211 are attached to the external I/F 315. It should be noted that the recording medium 321 is connected to the printing apparatus 300 detachably.

The memory 318 stores image data input from external apparatuses via the communication module 316 and print settings including paper profile information selected by user operation using the control panel 314. In addition, the memory 318 stores programs read by the CPU 311. The communication module 316 exchanges data with the external apparatuses including a PC and a server apparatus.

The data analyzer 317 analyzes the print job received from the external apparatus and instructs the print controller 319 to expand into the image data to generate the video data. The engine 340 receives the generated video data, forms an image or the recording paper fed by the paper feeder 330, and outputs the recording paper on the paper ejection tray 350.

Figure 5:
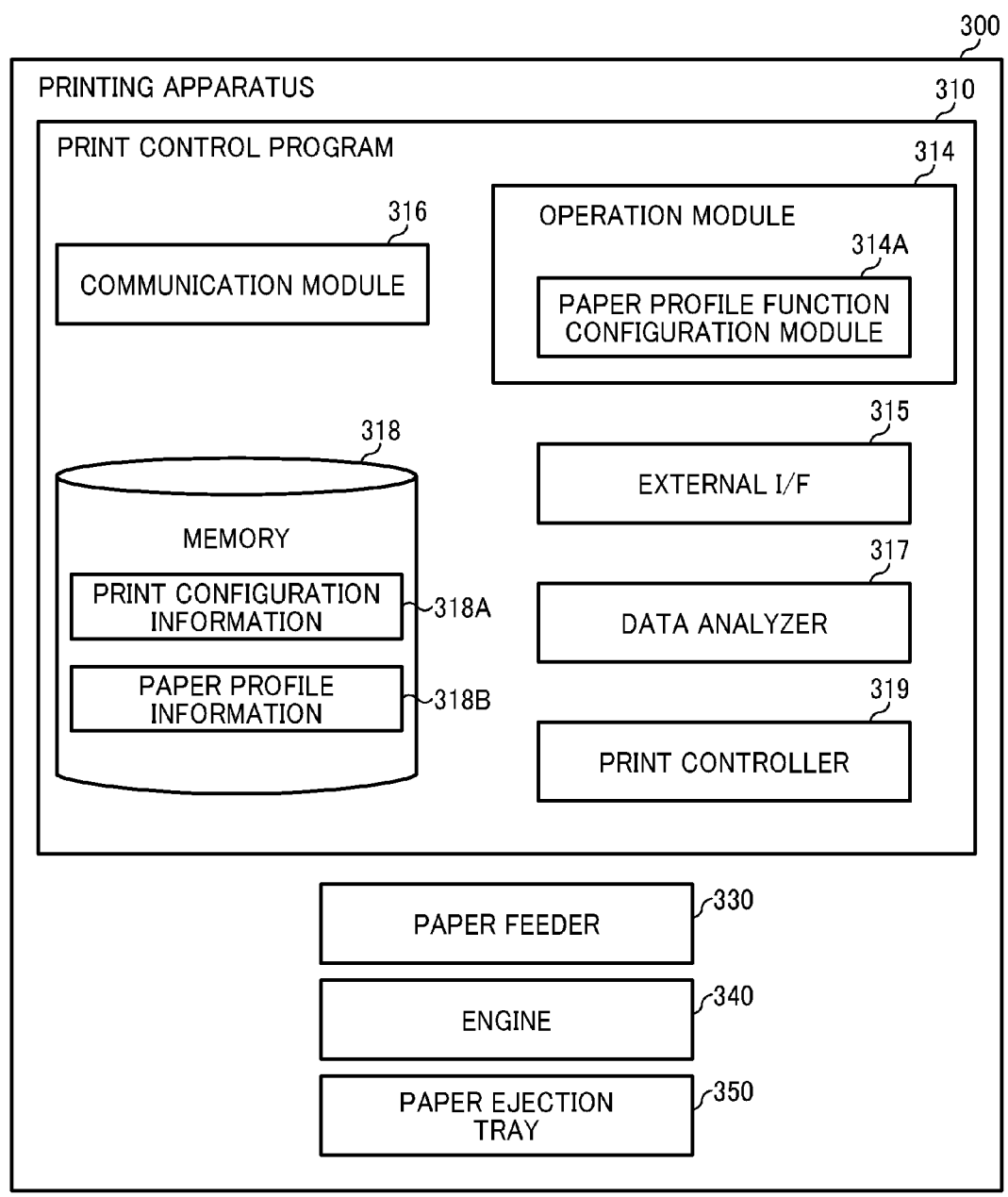
FIG. 5 is a block diagram illustrating a functional configuration of the printing apparatus of the information processing system as an embodiment of the present invention.

Next, a functional configuration of the printing apparatus that constructs the information processing system in this embodiment is described below. FIG. 5 is a block diagram illustrating a functional configuration of a printing apparatus that constructs the information processing system in this embodiment.

In FIG. 5, the printing apparatus 300, which has a paper profile function implemented by the print control program 310, analyzes the print job received from the print spooler 250 in FIG. 3 and expands the analyzed print job into the image data to generate the video data. The printing apparatus 300 includes the paper feeder 330 that contains various recording paper and the engine 340 that receives the video data transferred by the print control program 310 and prints the received video data on the recording paper fed by the paper feeder 330. Furthermore, the printing apparatus 300 includes the paper ejection tray 350 on which the printed recording paper is ejected.

It should be noted that the print control program 310 includes the communication module 316 that receives the print job from the print spooler 250 and the data analyzer 317 that analyzes the received print job. In addition, the print control program 310 includes as print controller 319 that expands into the image data to generate the video data and the control panel 314 that displays the operational screen to accept user instruction. Furthermore, the print control program 310 includes the memory 318 that stores various setting values of the printing function input using the control panel 314.

The control panel 314 includes a paper profile function setting configuration module 314A that can register multiple paper profiles including multiple paper attribute information. The memory 318 stores print setting information 318A and paper profile information 318B configured using the control panel 314. In this case, if the host computer 200 requests to obtain the paper profile information 318B, the print control program 310 returns the paper profile information 318B to the host computer 200.

Next, a list of paper profiles used in the information processing system in this embodiment and types of paper attribute information used in the information processing system in this embodiment are described below. FIG. 6A is a diagram illustrating a list of paper profiles used in the information processing system, and FIG. 6B is a diagram illustrating types of paper attribute information used in the information processing system.

As shown in FIG. 6A, the paper profile list 400 includes multiple paper profiles 410 including multiple paper attribute information 420 in FIG. 6B for each paper registered in the printing apparatus 300. As shown in FIG. 6A, the paper profile 410 can register and use multiple types of paper, and as shown in FIG. 6B, multiple pieces of paper attribute information 420 (37 pieces in this embodiment) corresponds to one paper profile.

As a result, in the paper profile list 400 in FIG. 6A, only 4 pieces of paper attribute information (i.e., paper name, paper outline, size, and basic weight) among all 37 pieces of the paper attribute information in FIG. 6B can be displayed due to the limitation of a size of the display screen of the UI module 241. If the paper attribute information 420 to be checked does not appear on the screen of the UI module 241, it is required to scroll the screen of the UI module 241 horizontally until the paper attribute information 420 to be checked appears.

Figure 7A:
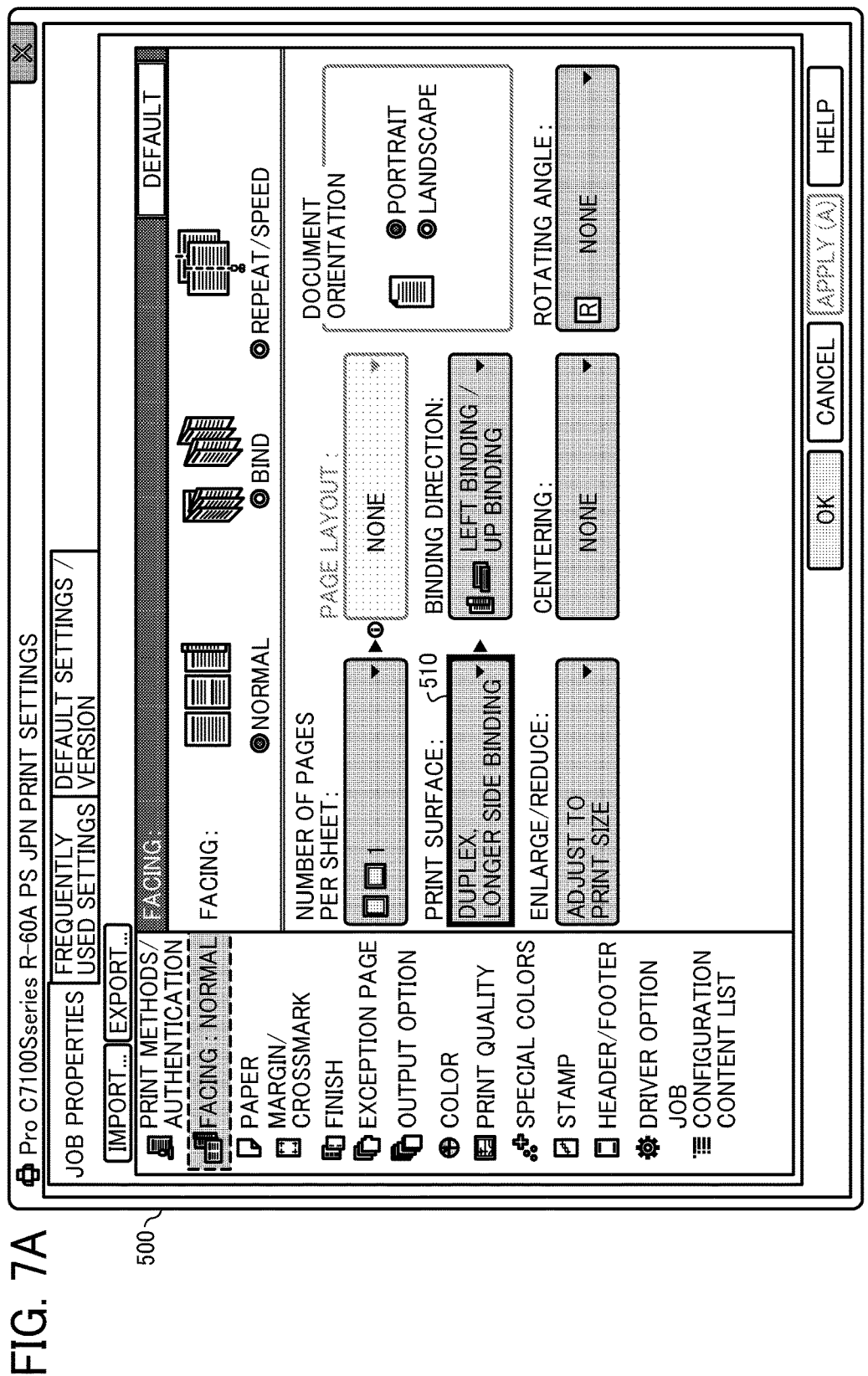
FIG. 7A is a diagram illustrating a facing configuration screen of the paper profile list in duplex printing in the information processing system.

Next, a facing configuration screen of the paper profile list in duplex printing in the information processing system in this embodiment and a paper configuration screen of the paper profile list in duplex printing in the information processing system in this embodiment are described below. FIG. 7A is a diagram illustrating a facing configuration screen of the paper profile list in duplex printing in the information processing system in this embodiment, and FIG. 7B is a diagram illustrating a paper configuration screen of the paper profile list in duplex printing in the information processing system in this embodiment.

Here, a specific example of configuring the print setting function and the paper profile using the UI is described below. FIG. 7A is a diagram illustrating a UI configuration (duplex printing function configuration screen) in case of selecting duplex printing and paper profile in this embodiment. That is, in this embodiment, print settings are selected using the print configuration screen (i.e., UI) that accepts selection of print settings. In the print configuration screen 500 on the UI module 241, duplex printing is selected by selecting "duplex, longer side binding" 510 from a print surface pull-down menu in "facing:normal" menu.

Next, in a print configuration screen 520 in FIG. 7B, after selecting "paper list" 530 from options in "paper" menu, a paper profile list 540 is displayed. As a result, it is possible to configure print settings specifying duplex printing and selecting paper to be used from the paper profile list 540.

However, regarding the paper attribute information including paper attribute for duplex printing such as duplex printing is allowed, as shown in the paper profile list 540 in FIG. 7B, only four items (paper name, paper outline, size, and basic weight) can be checked in the screen displayed initially. Therefore, in case of selecting the paper profile, it is required to scroll the paper attribute horizontally until the paper attribute information to be checked appears.

Figure 8A:
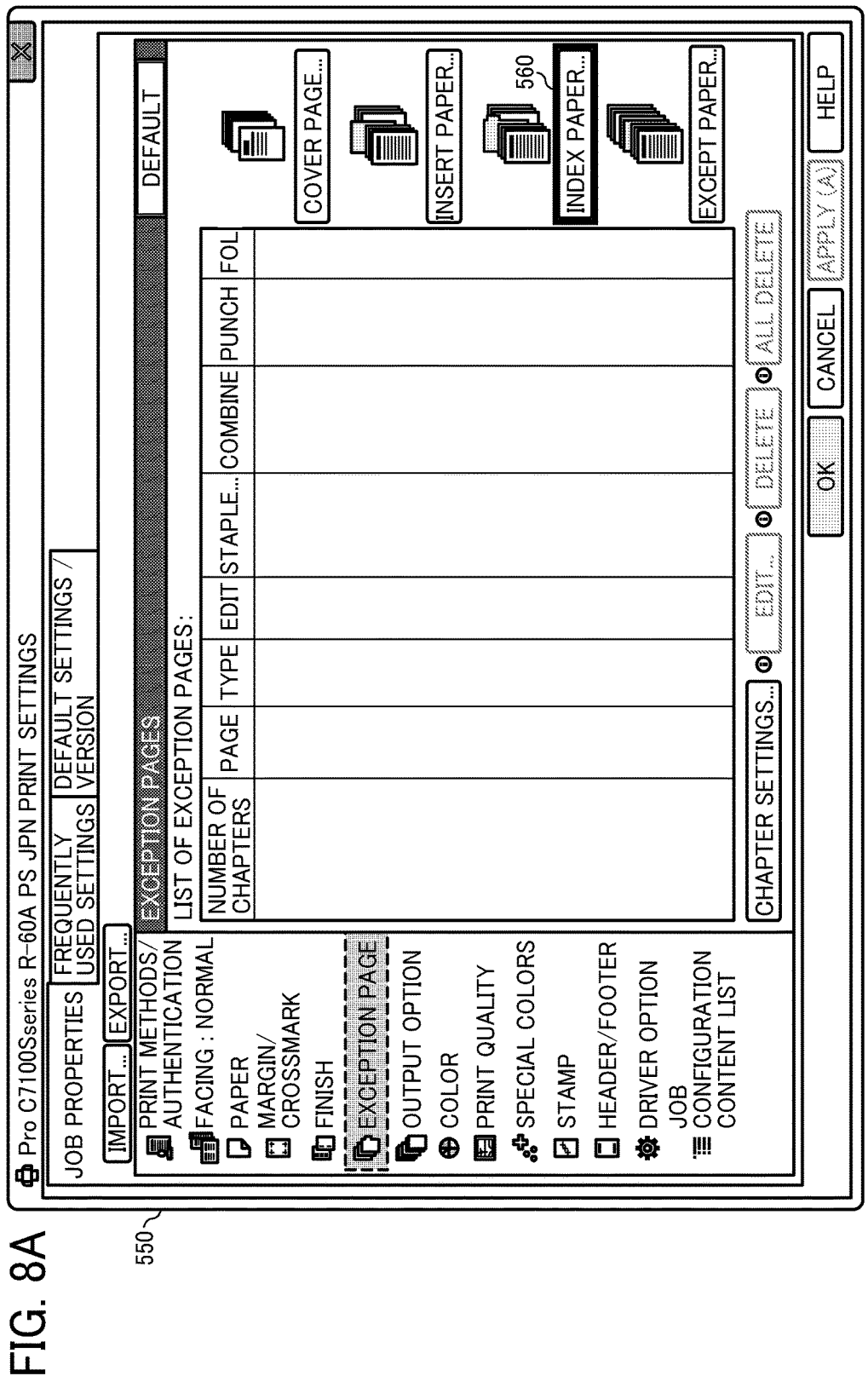
FIG. 8A is a diagram illustrating an exception page configuration screen of the paper profile list in index paper printing in the information processing system.
Figure 8B:
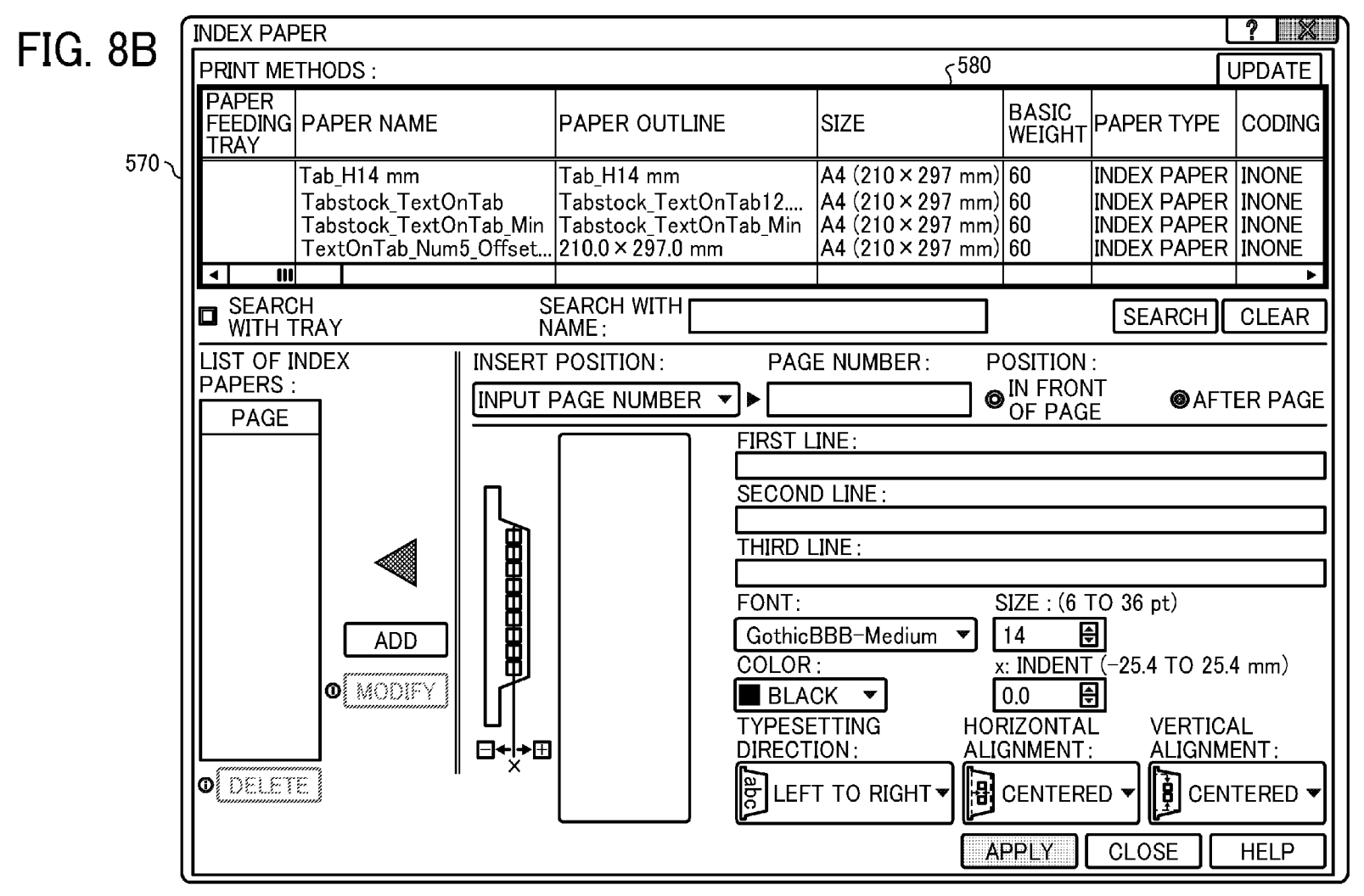

Next, an exception page configuration screen of the paper profile list in index paper printing in the information processing system in this embodiment and a selection method configuration screen of the paper profile list in index paper printing in the information processing system in this embodiment. FIG. 8A is a diagram illustrating an exception page configuration screen of the paper profile list in index paper printing in the information processing system in this embodiment, and FIG. 8B is a diagram illustrating a selection method configuration screen of the paper profile list in index paper printing in the information processing system in this embodiment.

Here, an example of configuring the UI screen in case of specifying the index paper to be used and selecting the paper profile is described below. That is, in this embodiment, print settings are selected using the print configuration screen (i.e., UI) that accepts specifying print settings. As shown in FIG. 8A, in a print configuration screen 550 on the UI module 241, "index paper" button 560 in "exception page" menu is selected.

As a result, as shown in FIG. 8B, a print setting screen 570 in which an index paper printing function can be specified is displayed, and the paper profile list 580 is displayed at the same time. In this case, the paper profile of the index paper is set by default.

As a result, it is possible to configure print settings specifying the index paper and selecting the paper profile. However, for example, regarding the paper profile including paper attribute for printing the index paper such as the number of tabs etc., as shown in the paper profile list 580 in FIG. 8B, only five items can be checked in the screen displayed initially. That is, it is possible to check paper name, paper outline, size, basic weight, and coding only. Therefore, in case of selecting the paper profile, it is required to scroll the paper attribute horizontally until the paper attribute to be checked appears.

Figure 9B:
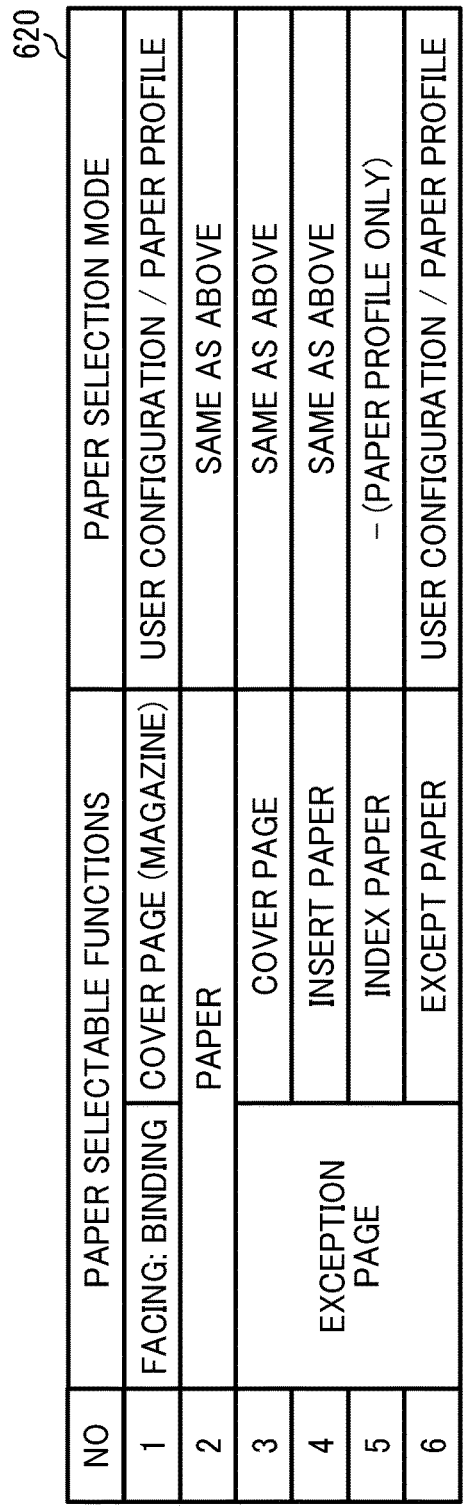
FIG. 9B is a diagram for explaining paper selection performed by the information processing system.

Next, a function/paper attribute association table as a specific function in the information processing system in this embodiment and functions that can select paper as a specific function in the information processing system in this embodiment are described below. FIG. 9A is a diagram illustrating a function/paper attribute association table as a specific function in the information processing system in this embodiment, and FIG. 9B is a diagram illustrating functions that can select paper as a specific function in the information processing system in this embodiment.

As shown in FIG. 9A, in a function/paper attribute association table 610, the preferentially-displayed paper attribute information is associated with a predetermined configuration, and priorities for inserting the paper attribute information are in descending order. It should be noted that the paper attribute information displayed preferentially is a part of the paper attribute information of the target paper. In addition, in FIG. 9A, while only one printing condition "facing, duplex" is specified as a paper attribute sorting target function for target function index "1", it is possible to specify multiple printing conditions for the paper attribute sorting target function. For example, for target function index "6", it is possible to specify multiple printing conditions such as "facing, duplex" and "color, b/w" for the paper attribute sorting target function.

In addition, as shown in FIG. 9B, a list 620 displays a list of functions that can select paper, and each of the functions includes a paper selection mode that can select user configuration and paper profile. However, only the index paper of the exception page does not have the paper selection mode, and the paper profile is fixed for the index paper.

For example, in FIGS. 7A and 7B described above, the paper attribute information (five items) corresponding to target function index 1 is preferentially displayed, and in FIGS. 8A and 8B, the paper attribute information (five items) corresponding to target function index 2 is preferentially displayed.

Figure 10:
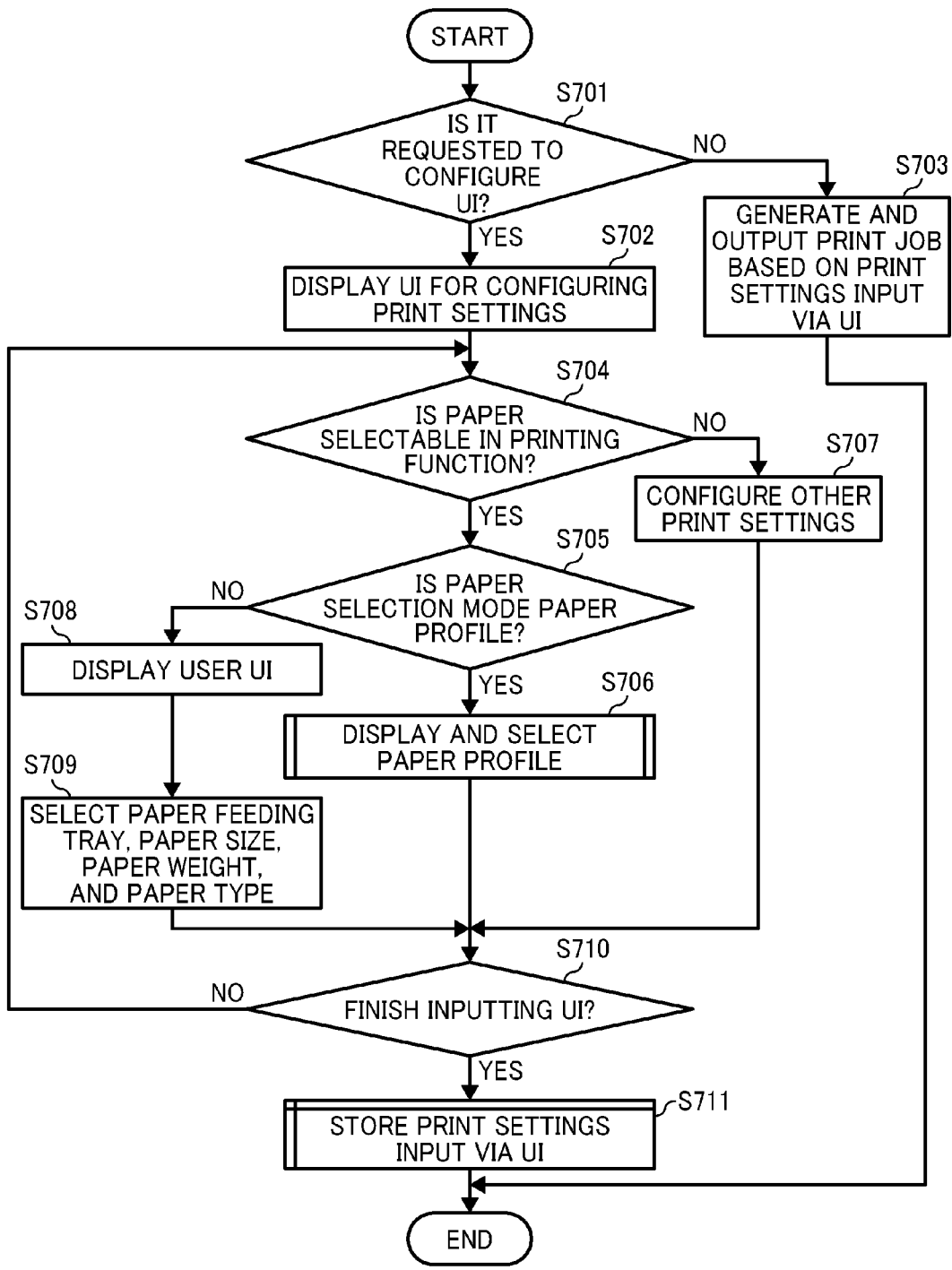
FIG. 10 is a flowchart illustrating an operation of generating a print job in the information processing system as an embodiment of the present invention.

Next, an operation of generating a print job in the information processing system in this embodiment is described below. FIG. 10 is a flowchart illustrating an operation of generating a print job in the information processing system in this embodiment.

In case of starting the application software 220 in the host computer 200 and printing target printed matter, a print configuration as a request to configure UI is selected on the print configuration screen of the application software 220, and printing is performed. In this case, a request to configure UI for selecting the print configuration and a request to print for performing printing are transferred to the print job generating software 240 via the print interface 230. A flowchart for processing the two requests in the print job generating software 240 is described below.

In S701, it is determined whether or not the request to configure UI exists. If it is determined that the request to configure UI exists (YES in S701), the step proceeds to S702, and it is prompted to input by user operation by displaying the UI for configuring print settings. After that, in S704, it is determined whether or not the printing function that can select paper is used.

If it is determined that the printing function that can select paper is used (YES in S704), the step proceeds to S705. If it is determined that the printing function that can select paper is not used (NO in S704), the step proceeds to S707. In S705, it is determined whether or not the paper selection mode is paper profile.

That is, in case of obtaining printed matter using the paper profile, the printing function that can select paper is specified on the UI for configuring print settings in S702. Subsequently, in S704, if the printing function that can select paper is specified (YES in S704), the UI in the paper selection mode is displayed to specify either the paper profile or user setting.

If it is determined that the paper selection mode is paper profile (YES in S705), the step proceeds to S706, and the paper profile display is selected. If it is determined that the paper selection mode is not paper profile (NO in S705), the step proceeds to S708, and the user configuration UI is displayed. In S709, a sheet feeding tray, a paper size, paper weight, and a paper type are selected.

If it is determined that the printing function that can select paper is not used (NO in S704), other functions regarding printing is configured in S707. In S710, it is determined whether or not it is finished to input information on the UI. If it is determined that it is not finished to input information on the UI (NO in S710), the step goes back to S704.

If it is determined that it is finished to input information on the UI (YES in S710), the step proceeds to S711. After storing the print setting values input on the UI, the operation ends. By contrast, if it is determined that it is not requested to configure UI (NO in S701), the step proceeds to S703. In S703, a print job is generated based on all UI setting values for printing currently configured, the print job is transferred to the printing apparatus 300 via the print spooler 250, and the operation ends.

Figure 11:
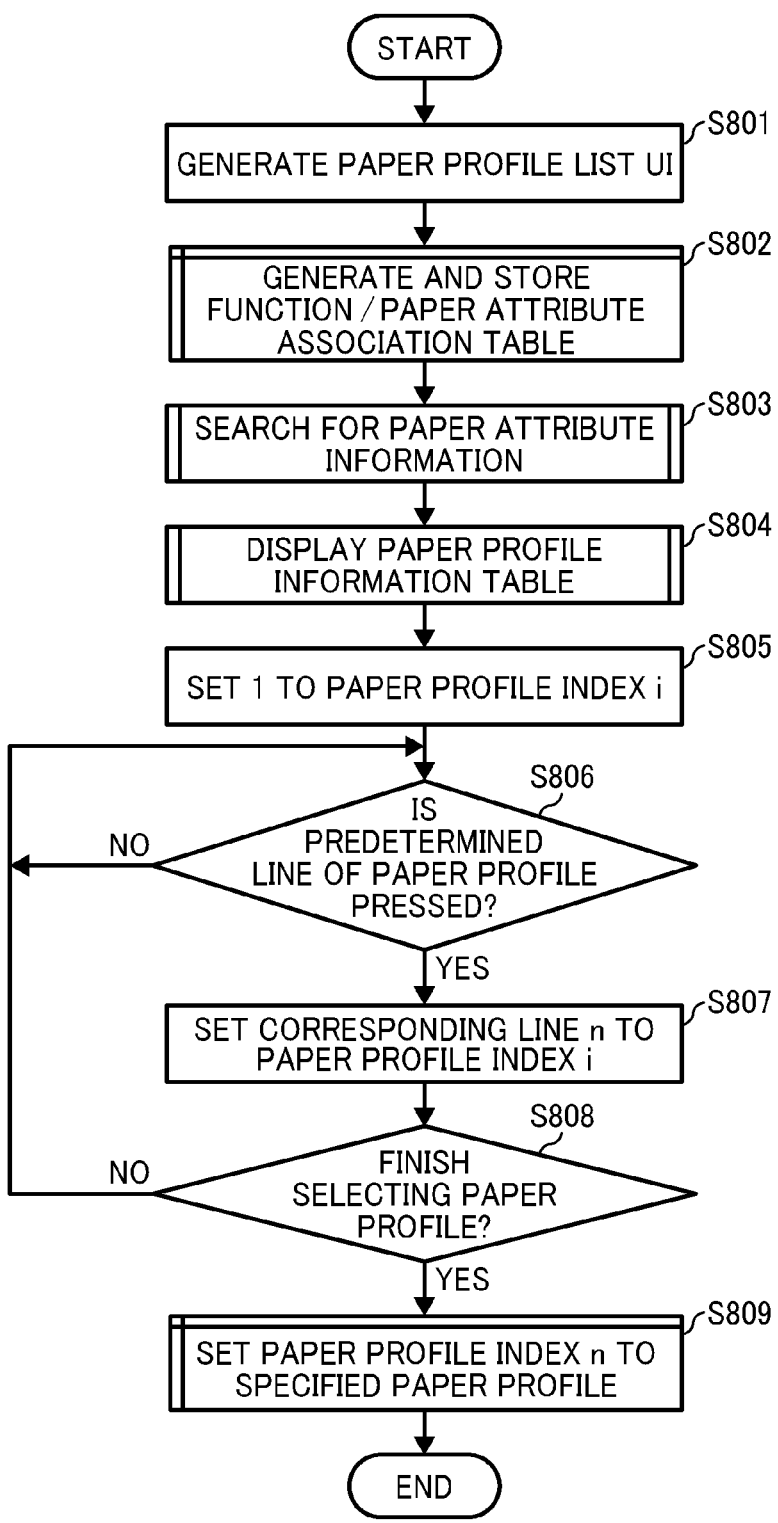
FIG. 11 is a flowchart illustrating an operation of displaying and selecting a paper profile in the information processing system as an embodiment of the present invention.

Next, an operation of displaying and selecting a paper profile in the information processing system in this embodiment is described below. FIG. 11 is a flowchart illustrating an operation of displaying and selecting a paper profile in the information processing system in this embodiment.

This is a flowchart for an operation that displays the paper profile list from the function/paper attribute association table 610 in FIG. 9A, updates the paper profile list, and allows to select the paper profile used for printing by user operation. First, in order to display the paper profile list, in S801, a table UI for the paper profile list is generated. Subsequently, in S802, after generating the function/paper attribute association table 610 in FIG. 9A, the function/paper attribute association table 610 is stored in the function/paper attribute association information storing module 242A.

Next, in order to search for paper attribute information displayed preferentially for the function specified by user operation, in S803, the paper attribute information is searched. The operation in S803 is described later in detail with reference to FIG. 12.

After that, depending on whether or not it is required to sort the paper attribute information, in S804, the paper profile information table is displayed to display the paper profile list. The operation in S804 is described later in detail with reference to FIG. 13.

Next, in S805, target function index value i of paper profile on the paper profile list is set to 1 as an initial value.

Next, in S806, it is determined whether or not the paper profile item is selected, i.e., a predetermined line for selecting the paper profile item is pressed. If it is determined that the predetermined line for selecting the paper profile item is not pressed (NO in S806), the operation waits until the predetermined line is pressed. If it is determined that the predetermined line for selecting the paper profile item is pressed (YES in S806), the step proceeds to S807. In S807, the target function index value i of paper profile is set to value n corresponding to the predetermined line for selecting the paper profile item.

In S808, it is determined whether or not it is finished to select paper profile. If it is determined that it is not finished to select paper profile (NO in S808), the step goes back to S806. If it is determined that it is finished to select paper profile (YES in S808), the step proceeds to S809.

In S809, the nth target function index value of paper profile on the function/paper attribute association table 610 is stored in a specified paper profile as the paper profile specified by user operation, and the operation ends.

Figure 12:
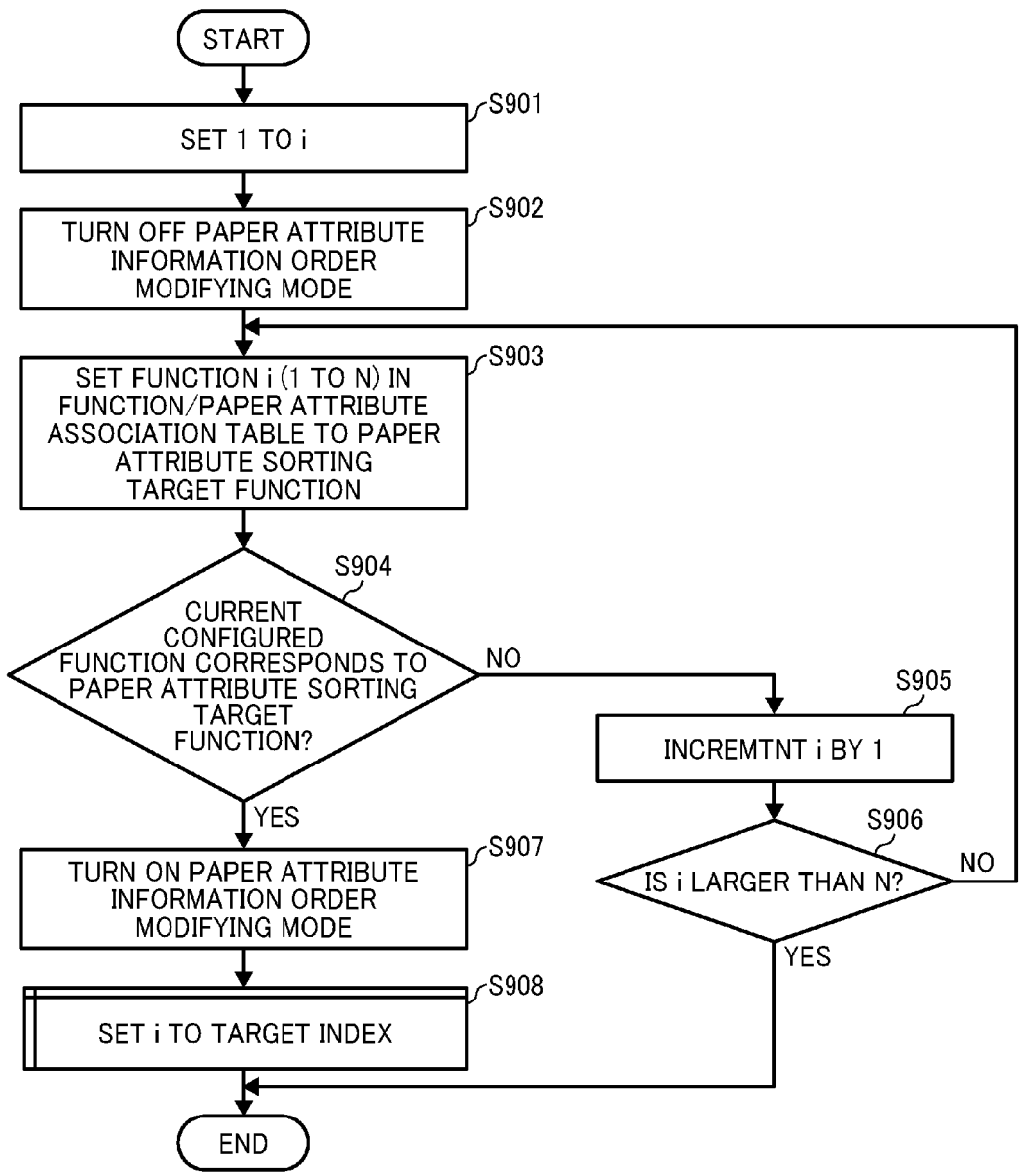
FIG. 12 is a flowchart illustrating an operation of searching for paper attribute information in the information processing system as an embodiment of the present invention.

Next, an operation of searching for paper attribute information in the information processing system in this embodiment is described below. FIG. 12 is a flowchart illustrating the operation of searching for paper attribute information in the information processing system in this embodiment.

FIG. 12 is a flowchart illustrating the operation in S803 in the paper profile display selecting operation in FIG. 11 that searches for paper attribute information displayed preferentially for the specified function. First, in S901, a target function index i in the function/paper attribute association table 610 is set to 1. Subsequently, in S902, the paper attribute information order modifying mode flag is turned off as an initial setting.

Next, in S903, the paper attribute sorting target function is set to the ith target function index in the function/paper attribute association table 610. Subsequently, in S904, it is compared whether or not the current target function index value specified by user operation corresponds to the paper attribute sorting target function index value.

Here, the current target function index value configured by user operation indicates the target function index value that has already been specified on the print configuration screen by user operation. An example of such case is that the index paper printing function (whose index value is 2) is specified as the paper attribute sorting target function if the duplex printing function (whose index value is 1) in FIG. 7 is specified by user operation.

If the current target function index value does not correspond to the paper attribute sorting target function index value (NO in S904), the step proceeds to S905 to increment i by 1, and the step proceeds to S906. In S906, it is determined whether or not i is larger than N. If i is not larger than N (NO in S906), the step goes back to S903. That is, it is repeated to compare i with N until i becomes larger than N. If i is larger than N (YES in S906), the operation ends. It should be noted that N is the maximum value of the target function index value.

If it is determined that the current target function index value corresponds to the paper attribute sorting target function index value (YES in S904), the step proceeds to S907.

Since that indicates that the current target function is the target function that the paper attribute information is to be sorted, the paper attribute information order modifying flag is turned on. In S908, the target function index value is set to i and stored in the function/paper attribute association information storing module 242A, and the operation ends.

Figure 13:
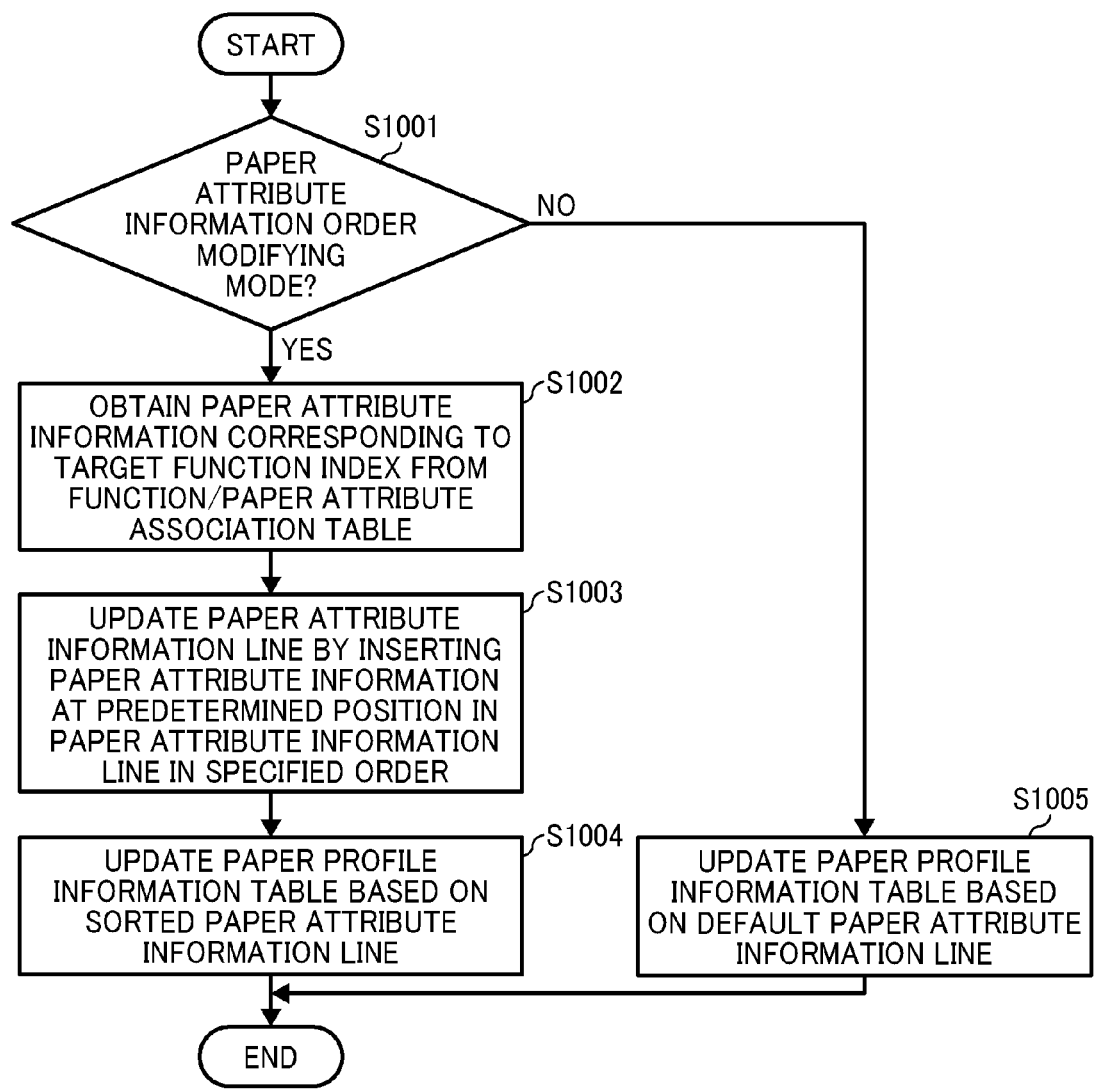
FIG. 13 is a flowchart illustrating an operation of displaying a paper profile information table in the information processing system as an embodiment of the present invention.

Next, an operation of displaying a paper profile information table in the information processing system in this embodiment is described below. FIG. 13 is a flowchart illustrating an operation of displaying a paper profile information table in the information processing system in this embodiment.

FIG. 13 is a flowchart illustrating the operation in S804 in the paper profile display selecting operation in FIG. 11 that updates the paper profile information table depending on whether or not it is required to sort paper attribute.

First, in S1001, it is determined whether or not the operation mode is the paper attribute information order modifying mode. If it is determined that the operation mode is not the paper attribute information order modifying mode (NO in S1001), that indicates that it is not required to sort the paper attribute information, and the step proceeds to S1005. Subsequently, the paper profile information table is updated based on the default paper attribute information line, and the operation ends.

By contrast, if it is determined that the operation mode is the paper attribute information modifying mode (YES in S1001), it is required to sort the paper attribute information. Therefore, the step proceeds to S1002, and paper attribute information displayed preferentially corresponding to the function/paper attribute association table 610 is obtained from the function/paper attribute association table 610.

In S1003, the obtained paper attribute information to be displayed preferentially is inserted into a predetermined position in the paper attribute information line of the paper profile to sort the paper attribute information lines. In S1004, the paper profile information table is updated based on the paper attribute information lines sorted in S1003, and the operation ends.

Next, a conventional screen for specifying duplex printing in the information processing system in this embodiment and a screen for specifying duplex printing in the information processing system in this embodiment are described below. FIG. 14A is a diagram illustrating a conventional screen for specifying duplex printing in the information processing system in this embodiment, and FIG. 14B is a diagram illustrating a screen for specifying duplex printing in the information processing system in this embodiment.

FIG. 14B is an example diagram illustrating a paper profile list screen UI displayed in S1004 in the operation of displaying paper profile information table in FIG. 13 in duplex printing.

As described above with reference to FIG. 7A, in the print settings, facing is set to normal, print surface is set to duplex and longer side binding, and other settings are set to default values.

As described above with reference to FIG. 9A and S907 and S908 in FIG. 12, in the operation of searching paper attribute information, the target function index is set to 1.

As described above with reference to FIG. 9A, the function/paper attribute association table is the paper attribute information displayed preferentially and corresponds to settings, "allow duplex printing", "duplex, front, Y", "duplex, front, X", "duplex, back Y", and "duplex, back X".

As described above with reference to S1003 and S1004 in FIG. 13, the paper attribute information to be displayed preferentially described above is inserted into an area next to the predetermined position equal to "size", and the paper attribute information lines are sorted and displayed.

As shown in FIG. 14A, in the conventional screen, in case of using the paper profile in specifying duplex printing, it is required to scroll the screen to the right by user operation to display and search for the paper attribute information to be checked every time.

By contrast, in this embodiment, just after selecting the paper profile, for example, in duplex printing, as shown in FIG. 14B, it is required to scroll the screen a bit to display the paper attribute information "duplex, back". However, it is possible to check the paper attribute information up to "duplex, front, X" without scrolling the screen horizontally. As a result, since it is possible to display the paper attribute information to be checked within almost one screen, improving usability.

Next, a conventional screen for specifying duplex printing in the information processing system in this embodiment and a screen for specifying index paper printing in the information processing system in this embodiment are described below. FIG. 15A is a diagram illustrating a conventional screen for specifying index paper printing in the information processing system in this embodiment, and FIG. 15B is a diagram illustrating a screen for specifying index paper printing in the information processing system in this embodiment.

FIG. 15B is an example diagram illustrating a paper profile list screen UI displayed in S1004 in the operation of displaying paper profile information table in FIG. 13 in index paper printing.

As described above with reference to FIG. 8A, in the print settings, exception page and index paper are specified, and other settings are set to delimit values.

As described above with reference to FIG. 9A and S907 and S908 in FIG. 12, in the operation of searching paper attribute information, the target function index is set to 2.

As described above with reference to FIG. 9A, the function/paper attribute association table is the paper attribute information displayed preferentially and corresponds to settings, "number of tabs", "upper margin", "tab width", "tab height", and "tab shift".

As described above with reference to S1003 and S1004 in FIG. 13, the paper attribute information to be displayed preferentially described above is inserted into an area next to the predetermined position equal to "size", and the paper attribute information lines are sorted and displayed.

As shown in FIG. 15A, in the conventional screen, in case of using the paper profile in specifying index paper printing for example, it is required to scroll the screen to the right by user operation to display and search for the paper attribute information to be checked every time.

By contrast, in this embodiment, just after selecting the paper profile, for example, in index paper printing, as shown in FIG. 15B, it is required to scroll the screen a bit to display the paper attribute information "tab shift". However, it is possible to check the paper attribute information up to "tab height" without scrolling the screen horizontally. As a result, since it is possible to display the paper attribute information to be checked within almost one screen, improving usability.

Figure 16:
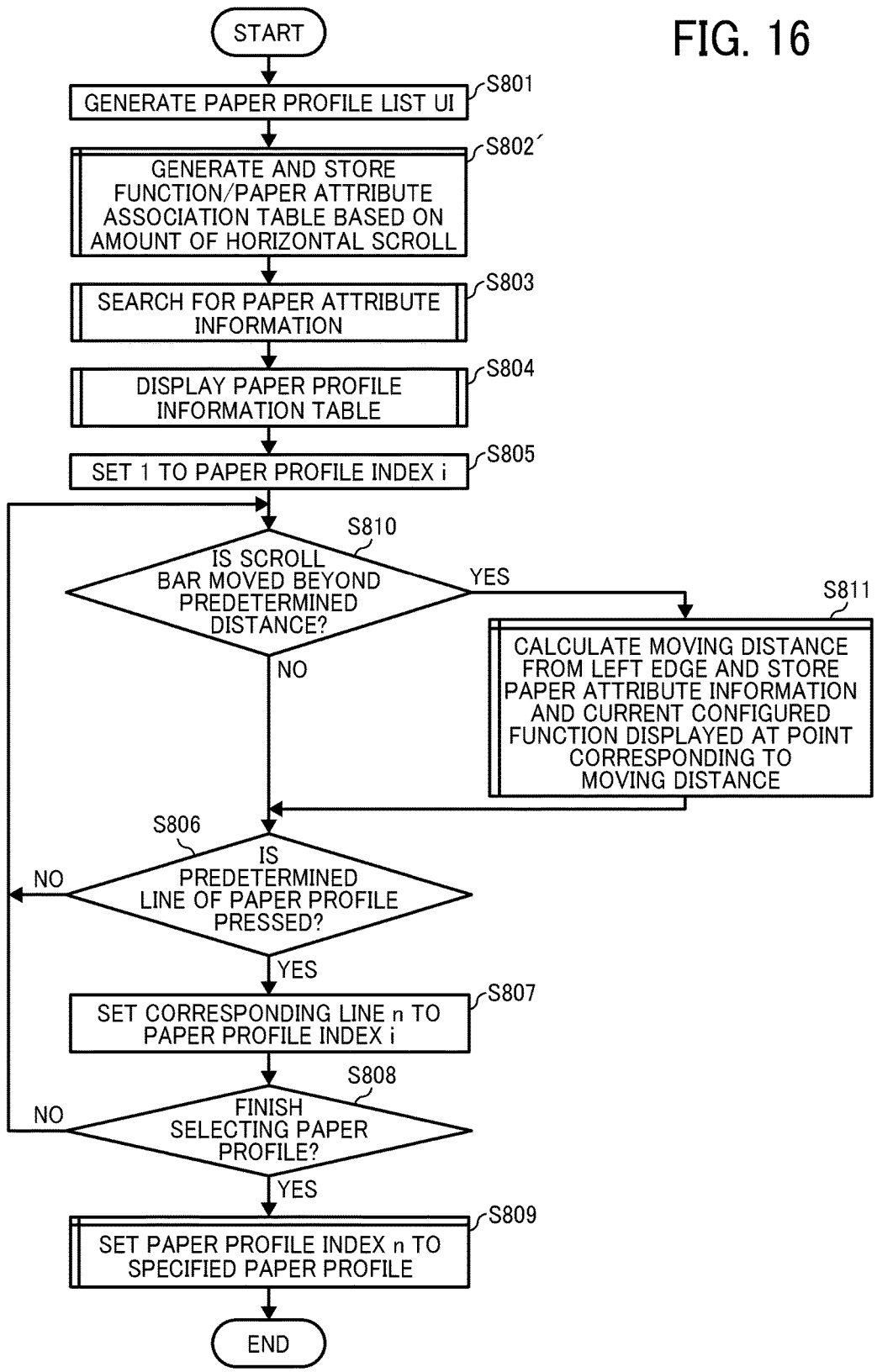
FIG. 16 is a flowchart illustrating an operation of generating the function/paper attribute association table later in the information processing system as an embodiment of the present invention.

Next, an operation of generating the function/paper attribute association table later in the information processing system in this embodiment is described below. FIG. 16 is a flowchart illustrating an operation of generating the function/paper attribute association table later in the information processing system in this embodiment.

FIG. 16 is a flowchart illustrating a modified operation of selecting paper profile display described above with reference to FIG. 11. That is, in FIG. 11, the function/paper attribute association table 610 is generated preliminarily using default information. However, in FIG. 16, the function/paper attribute association table 610 is generated later based an a history of user operation. More specifically, the operation in S802 is modified, and operations in S810 and S811 are added. The difference with FIG. 11 is described below.

In S802', history information of user operation on the scroll bar on the paper profile list UI in the past, more specifically, history information of moving scroll bar horizontally is stored. Subsequently, based on the history information of user operation, the function/paper attribute association table 610 is generated associating a target function with paper attribute information to be displayed, and the generated function/paper attribute association table 610 is stored.

In S810, it is detected whether or not the scroll bar moves beyond a predetermined distance. If it is detected that the scroll bar moves beyond the predetermined distance (YES in S810), the step proceeds to S811. In S811, a moving distance from the left edge of the screen is calculated, and paper attribute information to be displayed at a position corresponding to the moving distance is obtained from the function/paper attribute association table 610 associated and stored in S802' described above. Subsequently, the obtained paper attribute information is stored in the function/paper attribute association information storing module 242A along with the current configured function.

Here, the predetermined distance used in S810 is configured preliminarily as a moving distance to paper attribute information to be checked if there is no paper attribute information to be checked in the paper profile list screen displayed initially. For example, one third of the moving distance from the left edge to the right edge of the screen is configured as a distance that can be determined that the screen is moved clearly. In addition, regarding the paper attribute information obtained in S811, in case of moving beyond the predetermined distance, paper attribute information displayed in the paper profile list screen at the last moving position is specified and stored associated with the current configured function.

By modifying the operation in S802 and adding the operations in S810 and S811, it is possible to generate the function/paper attribute association table 610 later. In addition, it is possible to display the paper attribute information of paper profile list in accordance with user needs.

Next, to describe operations in S806, S810, and S811 in FIG. 16 concretely, those operations are described below with reference to FIGS. 17 to 22.

Next, a window display width and paper attribute line width in the paper profile list screen used in the information processing system in this embodiment are described below. FIG. 17 is a diagram illustrating a window display width and paper attribute line width in the paper profile list screen used in the information processing system in this embodiment.

In FIG. 17, regarding the window display width 1300, fixed display widths in the paper profile list screen for each function are preliminarily stored in the storing module 270 (paper attribute line display information 270D). In addition, regarding the paper attribute line width 1310, fixed line widths of paper attribute lines in the paper profile are preliminarily stored in the storing module 270 (paper attribute line display information 270D).

Figure 18B:
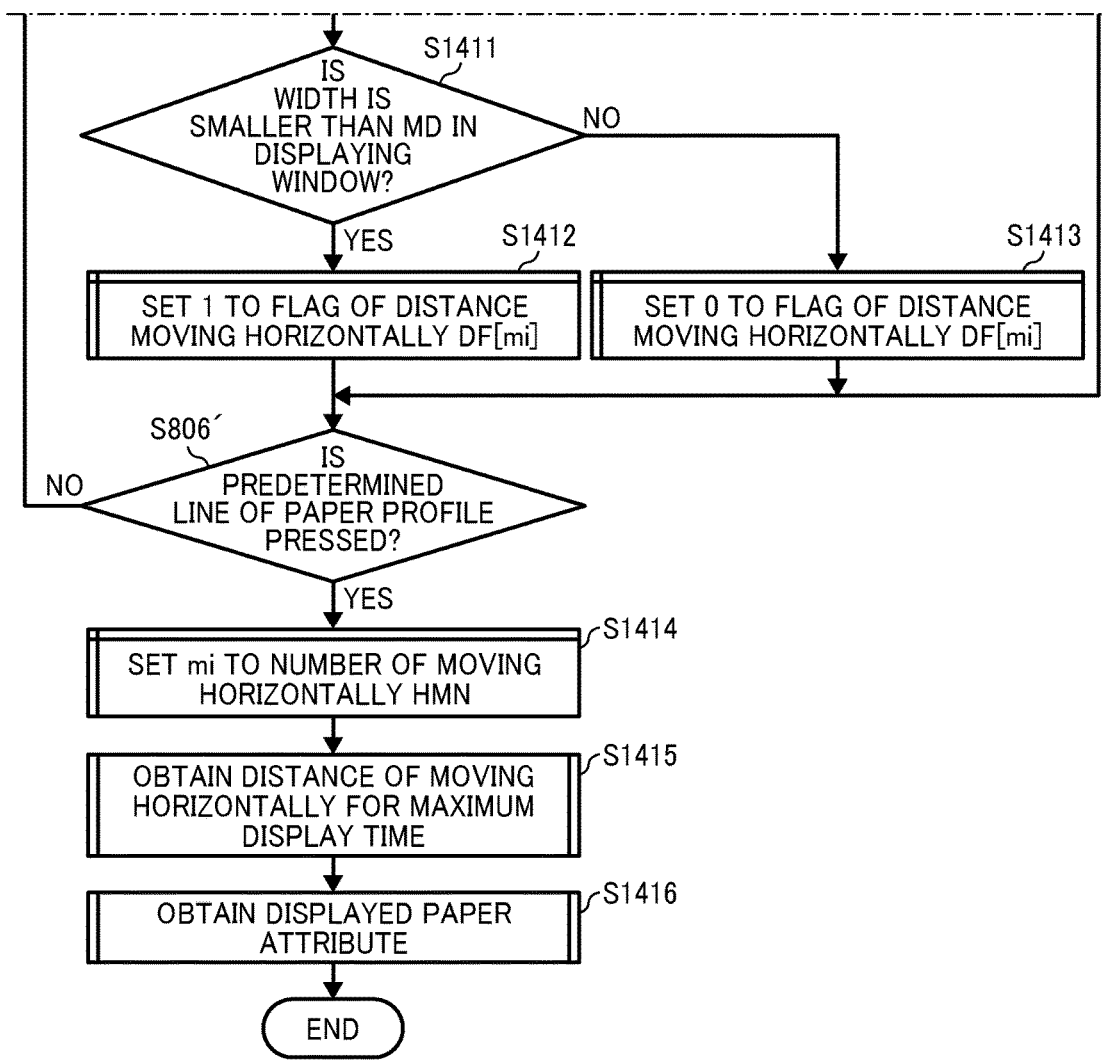

FIG. 18 is a diagram illustrating an operation of storing paper attribute information and a function displayed at a position corresponding to a moving distance after calculating the moving distance from the left edge of the screen in case of moving horizontally longer than a predetermined distance in the paper profile list screen in the information processing system as an embodiment of the present invention. FIG. 18 is a diagram illustrating an operation of storing paper attribute information and a function displayed at a position corresponding to a moving distance after calculating the moving distance from the left edge of the screen in case of moving horizontally longer than a predetermined distance in the paper profile list screen in the information processing system in this embodiment. Here, the predetermined distance indicates a distance moving to the paper attribute information that is not displayed on the paper profile list screen. That is, the window width 1300 as a display width of the paper profile list screen is considered ad the predetermined distance.

First, to use the window display width on the UI module 241 currently displaying the paper profile list as the predetermined distance, in S1401, the window display width of the paper profile list screen is set to the window display width. Subsequently, in S1402, when a content of the paper attribute information is checked to select paper profile by user operation, number of moving horizontal scroll mi as an index that counts the number of scrolling horizontally is set to 0.

Next, paper attribute information is checked on the paper profile list by user operation to select a paper profile item. That is, in S1403, it is determined whether or not the horizontal scroll bar is moved horizontally by user operation. If the horizontal scroll bar is not moved horizontally (NO in S1403), the step proceeds to S806' (described later). If the horizontal scroll bar is moved horizontally (YES in S1403), the step proceeds to S1404. In S1404, in accordance with the horizontal scroll, the number of horizontal scroll index mi is incremented by 1.

Next, distances for each horizontal scroll are obtained and set, and display time is calculated. Here, the distances for each horizontal scroll indicate distances from the left edge of the screen in scrolling horizontally by user operation on the paper profile list screen, i.e., distances of scrolling horizontally from the left edge of the screen MD. It is possible to obtain the horizontal scroll distance value from the memory 318 that stores the paper profile list screen information. In addition, the display time indicates time DT staying at the distance MD after scrolling horizontally by user operation while checking the content of the paper attribute information.

More specifically, in S1405, the distance MD scrolling horizontally is obtained from the memory 318 and set to the horizontal moving distance HD[mi]. The horizontal moving distance HD is to store the moving distance MD from the left edge of the screen after scrolling horizontally by user operation and an array value that stores the moving distance for the number of horizontal scroll index in the memory 318. In S1406, current time in scrolling horizontally is obtained and set to CT.

Next, in S1407, it is determined whether or not the number of horizontal scroll index mi exceeds 1. If it is determined that the number of horizontal scroll index mi does not exceed 1 (NO in S1407), the step proceeds to S1409. In S1409, the display time DT[mi] in scrolling horizontally is set to 0. Here, DT[mi] stores display time at the point after scrolling horizontally, and DT[mi] is an array value that stores the display time for the number of horizontal scroll index in memory 318.

By contrast, if it is determined that the number of horizontal scroll index mi exceeds 1 (YES in S1407), the step proceeds to S1408. In S1408, to calculate the previous display time in scrolling horizontally previously, time LT obtained in scrolling horizontally previously is subtracted from current time CT, and time DT[mi-1] displayed in horizontally scrolling previously is configured. In addition, in S1410, to calculate display time in scrolling horizontally next time, current time CT is set to LT.

In S1411, it is determined whether or not the distance MD scrolling horizontally exceeds the window display width as the predetermined distance. If it is determined that the horizontal scroll distance MD exceeds the window display width (YES in S1411), the step proceeds to S1412. If it is determined that the horizontal scroll distance MD does not exceed the window display width (NO in S1411), the step proceeds to S1413.

In S1412 and S1413, the horizontal moving distance flag DF[mi] is stored depending on whether or not the horizontal moving distance exceeds the predetermine distance, i.e., whether or not it is moved beyond the predetermined distance. More specifically, the flag stores 1 if the horizontal moving distance is equal to or more than the predetermined distance, and the flag stores 0 if the horizontal moving distance is less than the predetermined distance, and DF is an array value that stores flag values for the number of horizontal scroll index in the memory 318.

In S1412, the horizontal moving distance flag DF[mi] is set to 1. In S1403, the horizontal moving distance flag DF[mi] is set to 0. Subsequently, in S806', it is determined whether or not a predetermined line of the paper profile is pressed.

If it is determined that the predetermined line of the paper profile is not pressed (NO in S806'), the step goes back to S1403, and the operations from S1403 to S806' are repeated to store moving distances, display time, and distance flag information for each horizontal scroll are stored. By contrast, if it is determined that the predetermined line of the paper profile is pressed (YES in S806'), the step proceeds to S1414. Subsequently, in S1414, in order to store the number of horizontal scroll, the number of horizontal scroll HMN is set to the number of horizontal scroll index mi. Here, HMN indicates the number of horizontal scrolls until the paper profile is selected by user operation, and HMN is the horizontal moving distance for the maximum display time used in S1415.

In S1415, based on the moving distance, display time, and the distance flag information for each horizontal scroll, the horizontal moving distance for the maximum display time is obtained to obtain the horizontal moving distance whose display time is the longest. The operation in S1415 is described in detail later. Subsequently, in S1416, in order to obtain the paper attribute information displayed preferentially, the displayed paper attribute is obtained. The operation in S1416 is described in detail later.

In S1416, the screen is scrolled horizontally for the horizontal moving distance obtained in S1415 to the point whose display time is the longest by user operation to obtain the paper attribute information within the displayed width of the window displayed at that time, and the operation ends.

Figure 19:
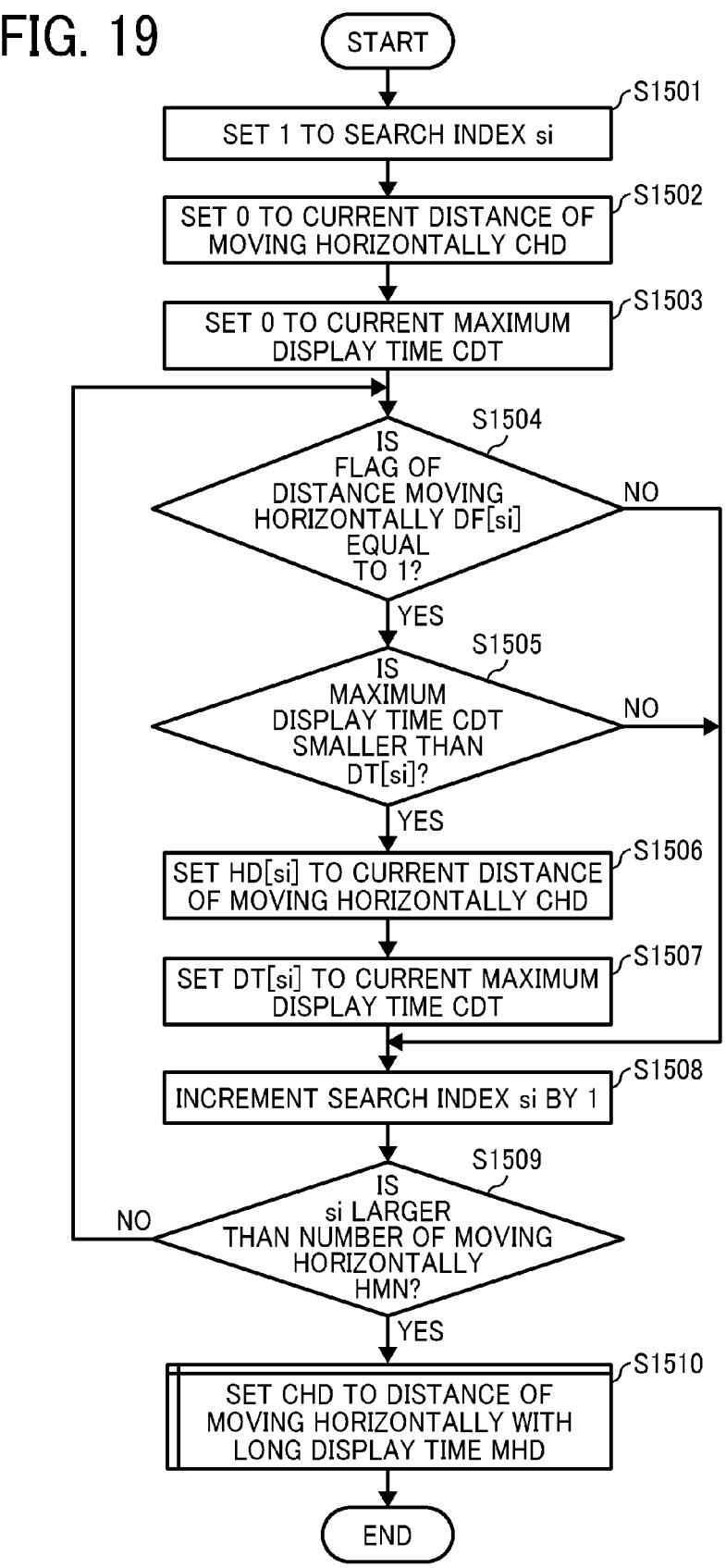
FIG. 19 is a diagram illustrating an operation of obtaining horizontal moving distance whose display time is the longest based on a moving distance, display time, and distance flag information for each horizontal move stored in FIG. 18 in the information processing system as an embodiment of the present invention.

Next, an operation of obtaining horizontal moving distance whose display time is the longest based on a moving distance, display time, and distance flag information for each horizontal move stored in FIG. 18 in the information processing system in this embodiment is described below. FIG. 19 is a diagram illustrating an operation of obtaining horizontal moving distance whose display time is the longest based on a moving distance, display time, and distance flag information for each horizontal move stored in FIG. 18 in the information processing system in this embodiment.

First, in S1501, a search index si for searching for moving distance, display time, and distance flag information for each horizontal scroll is set to 1 to initialize the search index si. Subsequently, in S1502, current horizontal moving distance CHD is set to 0 to initialize the horizontal moving distance CHD. In S1503, current maximum display time CDT is set to 0 to initialize the maximum display time CDT.

After that, in S1504, it is determined whether or not the horizontal moving distance flag DF[si] is equal to 1. In S1505, it is determined whether or not the maximum display time CDT is less than DT[si]. In other words, in S1504 and S1505, it is determined whether or not the horizontal moving distance is equal to or more than the predetermined distance, and it is determined whether or not the display time is maximum.

If it is determined that the horizontal moving distance flag DE[si] is equal to 1 (YES in S1504) and the maximum display time CDT is less than DT[si] (YES in S1505), the display time of DT[si] corresponds to the current search index is longer. As a result, in S1506, the horizontal moving distance HD[si] corresponding to that DT[si] is set to the current horizontal moving distance CHD. In addition, in S1507, the current maximum display time CDT is set to that DT[si]. Otherwise (NO in S1504 and NO in S1505), since the moving distance does not correspond to the predetermined distance and the display time is not maximum, no operation is performed and the step proceeds to S1508.

Next, in S1508, the search index is incremented by 1. In S1509, it is determined whether or not the search index si exceeds the number of horizontal scroll HMN. If it is determined that the search index si is less than the number of horizontal scroll HMN (NO in S1509), the step goes back to S1504, the operations from S1504 to S1509 are repeated for all horizontal scrolls.

By contrast if it is determined that the search index si exceeds the number of horizontal scroll HMN (YES in S1509), searches for all horizontal scroll values end. As described above, in S1506 and S1507, the horizontal moving distance whose display time is the longest is set to CHD. As a result, in S1510, the horizontal moving distance MHD with longer display time is set to that CHD, and the operation ends. The CHD is the horizontal moving distance whose display time is the longest among horizontal scrolls until the paper profile is selected by user operation, and the CHD is used in S1416 in FIG. 18 (i.e., the operation of obtaining displayed paper attribute).

Figure 20B:
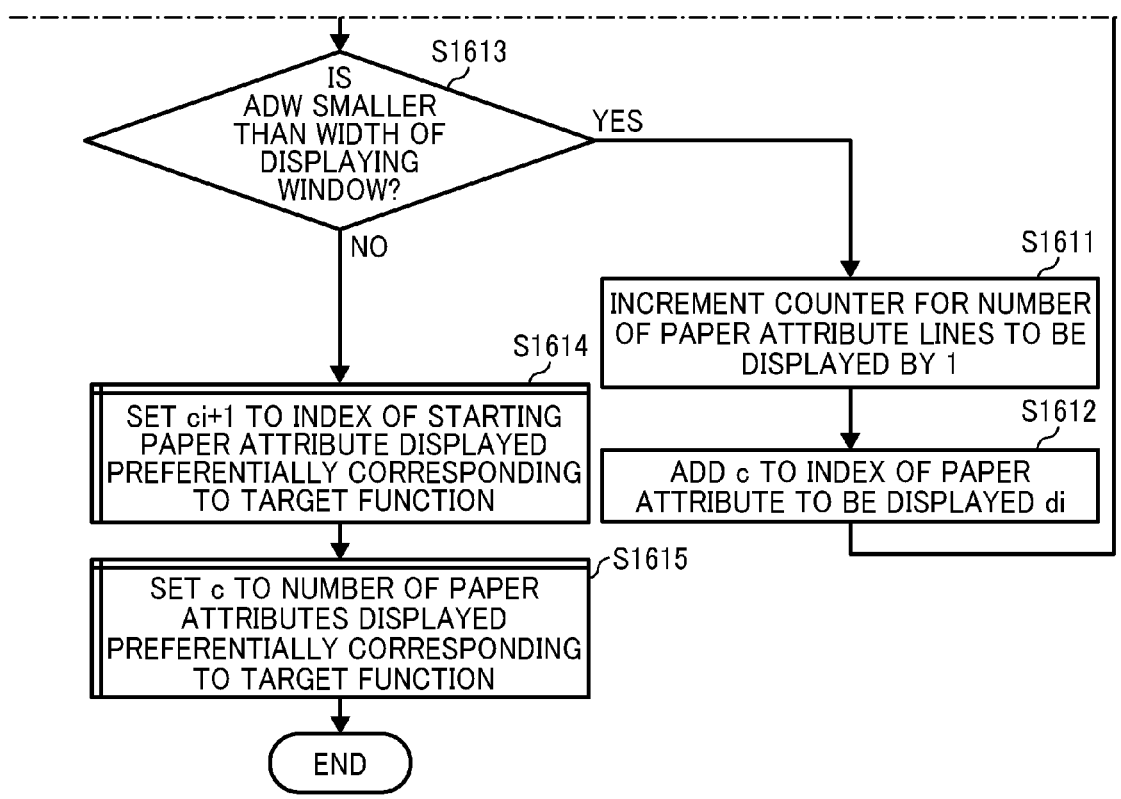

Next, an operation of obtaining paper attribute information in a displayed window after moving horizontal moving distance from the left edge of the screen based on the horizontal moving distance information whose display time is the longest stored in FIG. 19 in this embodiment is described below. FIG. 20 is a diagram illustrating an operation of obtaining paper attribute information in a displayed window after moving horizontal moving distance from the left edge of the screen based on the horizontal moving distance information whose display time is the longest stored in FIG. 19 in this embodiment. To move for horizontal moving distance from the left edge of the screen means to move to the point whose display time is the longest by user operation.

First, in order to calculate a display width of a paper attribute line from the left edge of the screen, in S1601, a display width of paper attribute line SCW from the left edge of the screen is set to 0 to initialize the display width of paper attribute line SCW. Subsequently, in S1602, a paper attribute line index ci is also set to 0 to initialize the paper attribute line index ci.

Next, in S1603, based on the current paper attribute order, each paper attribute line width CW[ci] corresponding to the paper attribute line width 1310 is obtained. Subsequently, in S1604, each paper attribute line width CW[ci] is added to the display width of paper attribute line SCW. The screen is scrolled for the display width of paper attribute line to the horizontal moving distance MHD whose display time is longer.

Here, the paper attribute line width is described below with reference to FIG. 21. FIG. 21 is a diagram illustrating a width of a paper attribute line from the left edge of the screen for each paper attribute information in the order of paper attributes in the paper profile list screen in the information processing system in this embodiment. Each paper attribute line width CW indicates a fixed line width stored as each paper attribute information and is an array value stored in the paper attribute line display information 270D of the storing module 270.

Back to FIG. 20, in S1606, it is determined whether or not the display width of paper attribute line SCW from the left edge of the screen added in S1604 is smaller than the horizontal moving distance MHD whose display time is longer. If it is determined that the display width of paper attribute line SCW from the left edge of the screen added in S1604 is smaller than the horizontal moving distance MHD whose display time is longer (YES in S1606), the step proceeds to S1605. In S1605, the paper attribute index ci is incremented by 1, and the operations from S1603 to S1606 are repeated.

If it is determined that the display width of paper attribute line SCW from the left edge of the screen added in S1604 is larger than the horizontal moving distance MHD whose display time is longer (NO in S1606), it indicates that the window is scrolled to the horizontal moving distance MHD value whose display time is the longest. As a result, in S1607, the paper attribute index to be displayed di is set to ci as a starting index of a paper attribute line to be displayed.

In addition, in S1608, all width of paper attribute to be displayed ADW for calculating a total value of each width of paper attribute is set to 0 to initialize the all width of paper attribute to be displayed ADW. Furthermore, in S1609, a counter of paper attribute to be displayed c for counting the number of paper attributes to be displayed is set to 0 to initialize the counter of paper attribute to be displayed c.

Next, the number of paper attributes displayable within the display width of window 1300 is obtained. In S1610, the width of paper attribute line CW[di] is added to the all width of paper attribute to be displayed ADW. Subsequently, in S1613, it is determined whether or not the all width of paper attribute to be displayed ADW is smaller than the display width of window 1300.

If it is determined that the all width of paper attribute to be displayed ADW is smaller than the display width of window 1300 (YES in S1613), the step proceeds to S1611, and the counter of paper attribute to be displayed c is incremented by 1. After that, in S1612, the counter of paper attribute to be displayed c is added to the paper attribute index to be displayed di, and the operations from S1610 to S1613 are repeated.

If it is determined that the all width of paper attribute to be displayed ADW is equal to or larger than the display width of window 1300 (NO in S1613), since the paper attribute item to be displayed has been obtained, the obtained paper attribute item is displayed preferentially for the target function.

In S1614, an index of starting paper attribute displayed preferentially corresponding to target function is set to ci+1. In S1615, the number of paper attributes displayed preferentially corresponding to target function is set to c, and the operation ends.

As described above, operations are described with reference to FIGS. 17 to 21. In the embodiment described above, the paper attribute information displayable within the display width of window from the point whose display time of paper attribute information checked by user operation is the longest is determined as the paper attribute information displayed preferentially for the target function. In addition, using the obtained index of starting paper attribute displayed preferentially corresponding to target function and the number of paper attributes, in S802' in FIG. 16, the paper attribute information displayed preferentially is obtained based on the order of paper attribute 1700 in FIG. 21. As described above, the function/paper attribute association table 610 is generated and stored to be used for displaying preferentially in next paper profile list screen.

Next, a function/paper attribute association table in the information processing system in this embodiment is described below FIG. 22 is a diagram illustrating a function/paper attribute association table in the information processing system in this embodiment. In FIG. 22, a function/paper attribute association table that a target function index indicates "2", a paper attribute sorting target function indicates "exception page—index paper", a paper attribute starting index indicates "10", the number of paper attributes indicates "5", and other functions are undefined is illustrated.

More specifically, five paper attributes, the 10th "number of tabs" to the 14th "tab shift" in the order of paper attributes 1700 in FIG. 21, are picked up as the paper attribute information displayed preferentially. As a result, FIG. 22 illustrates an updated table that indicates the target function index 1800 as "2", the paper attribute sorting target function 1801 as "exception page—index paper", and the paper attribute information displayed preferentially 1802.

Next, another function/paper attribute association table in the information processing system in this embodiment is described below. FIG. 23 is a diagram illustrating another function/paper attribute association table in the information processing system in this embodiment. In FIG. 23, a function/paper attribute association table that a target function index indicates "1", a paper attribute sorting target function indicates "facing—duplex", a paper attribute starting index indicates "24", the number of paper attributes indicates "4", and other functions are undefined is illustrated.

More specifically, four paper attributes, the 24th "mirror, front, Y" to the 27th "mirror, back, X" in the order of paper attributes 1700 in FIG. 21, are picked up as the paper attribute information displayed preferentially. As a result, FIG. 23 illustrates an updated table that indicates the target function index 1800 as "1", the paper attribute sorting target function 1801 as "facing—duplex", and the paper attribute information displayed preferentially 1802.

In the embodiments described above, even in case of being based on actual results of scrolling horizontally by user operation, subsequently, it is possible to display the paper attribute information corresponding to the function preferentially, and it is possible to select the paper profile item easily by user operation. In the embodiments described above, only the case whose display time is the longest is described. However, in case of displaying more number of paper attribute information preferentially, it is possible to determine considering multiple points whose display time is longer.

It should be noted that operations of functional blocks that construct the information processing apparatus in this embodiment shown in FIGS. 10 to 13, 16, and 18 to 20 can be executed by a program on a computer. That is, the CPU 201 on the host computer 200 loads a program stored in the ROM 202. Next, it is possible to implement the embodiment by executing each step of the program sequentially.

As described above, in the embodiment described above, multiple paper profile information including multiple paper attribute information is stored. Subsequently, based on the table that associates preferential displayed paper attribute information to be displayed preferentially with the function to be printed, the paper attribute information displayed preferentially is determined. Furthermore, the determined preferential displayed paper attribute intimation is displayed within one screen in preference to other paper attribute information. As a result, it is easily possible to check the target paper attribute information among paper profile information corresponding to the function to be printed.

The embodiments described above provide an information processing apparatus that can easily check the target paper attribute information among paper profile information.

The present invention also encompasses a non-transitory recording medium storing a program that executes an information processing method. The information processing method includes the steps of storing in a memory, for each one of a plurality of paper types, paper profile information that includes multiple paper attribute information each defining an attribute of paper, storing in the memory, preferentially displayed paper attribute information in association with at least one configuration, the preferentially displayed paper attribute information indicating paper attribute information to be displayed preferentially compared to other paper attribute information of the multiple paper attribute information, obtaining preferentially displayed paper attribute information corresponding to paper to be printed in the at least one configuration, and displaying preferentially displayed paper attribute information.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing apparatus including circuitry to perform a method comprising:
   (a) registering in a memory, for each registered paper type amongst a plurality of paper types, paper profile information corresponding to the registered paper type and including plural paper attribute information items each defining a corresponding attribute of paper;
   (b) presenting on a display, upon request, one or more items amongst the plural paper attribute information items registered in the paper profile information for a specified paper type amongst the plurality of paper types, and permitting at least one item to be changed amongst the displayed items, in response to receiving user operation to move a graphical representation provided in the display;
   (c) registering, in the memory, for each configuration amongst one or more configuration, plural preferentially displayed paper attribute information items in association with the configuration, each registered item, amongst the preferentially displayed paper attribute information items, having been determined based on a corresponding moving distance over which the graphical representation was moved exceeding a predetermined amount, the moving distance corresponding to a maximum display time, and the registered item constituting a preferentially displayed paper attribute information item to be displayed preferentially compared to other paper attribute information items that are not amongst the preferentially displayed paper attribute information items; and
   (d) determining, upon detecting that the user operation moving the graphical representation a moving distance exceeding the predetermined amount, one or more preferentially displayed paper attribute information items in a selected configuration corresponding to paper to be printed, to be displayed in place of the at least one item to be changed, at a position corresponding to the moving distance of the graphical representation, and controlling the display to display the one or more preferentially displayed items, amongst the plural preferentially displayed paper attribute information items, each of which was determined based on a corresponding moving distance corresponding to a maximum display time.

2. The information processing apparatus according to claim 1, wherein the preferentially displayed paper attribute information items include a plurality of paper attribute information items that are prioritized, and the circuitry displays the preferentially displayed paper attribute information in descendent order of priority.

3. The information processing apparatus according to claim 1, wherein the method performed by the circuitry further comprises:
   obtaining the preferentially displayed paper attribute information stored in association with a configuration selected by user operation amongst said at least one configuration.

4. The information processing apparatus according to claim 1, wherein the preferentially displayed paper attribute information items are a part of the plural paper attribute information items of the paper profile information.

5. The information processing apparatus according to claim 1, wherein a predetermined configuration is a printing configuration selected through a print configuration screen that accepts selection of printing settings.

6. A method of processing information, performed by circuitry included in an information processing apparatus, comprising:
   (a) registering in a memory, for each registered paper type amongst a plurality of paper types, paper profile information corresponding to the registered paper type and including plural paper attribute information items each defining corresponding attribute of paper;
   (b) presenting on a display, upon request, one or more items amongst the plural paper attribute information items registered in the paper profile information for a specified paper type amongst the plurality of paper types, and permitting at least one item to be changed amongst the displayed items, in response to receiving user operation to move a graphical representation provided in the display;
   (c) registering, in the memory, for each configuration amongst one or more configuration, plural preferentially displayed paper attribute information items in association with the configuration, each registered item, amongst the preferentially displayed paper attribute information items, having been determined based on a corresponding moving distance over which the graphical representation was moved exceeding a predetermined amount, the moving distance corresponding to a maximum display time, and the registered item constituting a preferentially displayed paper attribute information item to be displayed preferentially compared to other paper attribute information items that are not amongst the preferentially displayed paper attribute information items; and
   (d) determining, upon detecting that the user operation moving the graphical representation a moving distance exceeding the predetermined amount, one or more preferentially displayed paper attribute information items in a selected configuration corresponding to paper to be printed, to be displayed in place of the at least one item to be changed, at a position corresponding to the moving distance of the graphical representation, and controlling the display to display the one or more preferentially displayed items, amongst the plural preferentially displayed paper attribute information items, each of which was determined based on a corresponding moving distance corresponding to a maximum display time.

7. An information processing system comprising an information processing apparatus and an image processing apparatus connected to the information processing apparatus, the information processing apparatus including circuitry to perform a method
- (a) registering in a memory, for each one of registered paper type amongst a plurality of paper types, paper profile information corresponding to the registered paper type and including plural paper attribute information items each defining a corresponding attribute of paper;
- (b) presenting on a display, upon request, one or more items amongst the plural paper attribute information items registered in the paper profile information for a specified paper type amongst the plurality of paper types, and permitting at least one item to be changed amongst the displayed items, in response to receiving user operation to move a graphical representation provided in the display;
- (c) registering, in the memory, for each configuration amongst one or more configuration, plural preferentially displayed paper attribute information items in association with the configuration, each registered item, amongst the preferentially displayed paper attribute information items, having been determined based on a corresponding moving distance over which the graphical representation was moved exceeding a predetermined amount, the moving distance corresponding to a maximum display time, and the registered item constituting a preferentially displayed paper attribute information item to be displayed preferentially compared to other paper attribute information items that are not amongst the preferentially displayed paper attribute information items; and
- (d) determining, upon detecting that the user operation moving the graphical representation a moving distance exceeding the predetermined amount, one or more preferentially displayed paper attribute information items in a selected configuration corresponding to paper to be printed, to be displayed in place of the at least one item to be changed, at a position corresponding to the moving distance of the graphical representation, and controlling the display to display the one or more preferentially displayed items, amongst the plural preferentially displayed paper attribute information items, each of which was determined based on a corresponding moving distance corresponding to a maximum display time.

* * * * *